(12) United States Patent
Gazerro et al.

(10) Patent No.: US 11,434,928 B2
(45) Date of Patent: Sep. 6, 2022

(54) BRACKETRY FOR CEILING FAN OR LAMP RETROFITS AND METHOD OF INSTALLING SAME

(71) Applicants: Peter Gazerro, Cerritos, CA (US); Robert Leo, Bellflower, CA (US)

(72) Inventors: Peter Gazerro, Cerritos, CA (US); Robert Leo, Bellflower, CA (US)

( * ) Notice: Subject to any disclaimer, the term of this patent is extended or adjusted under 35 U.S.C. 154(b) by 0 days.

(21) Appl. No.: 16/742,579

(22) Filed: Jan. 14, 2020

(65) Prior Publication Data

US 2020/0224676 A1 Jul. 16, 2020

Related U.S. Application Data

(60) Provisional application No. 62/792,656, filed on Jan. 15, 2019.

(51) Int. Cl.
| | | |
|---|---|---|
| *F04D 29/00* | (2006.01) | |
| *F04D 29/60* | (2006.01) | |
| *F16M 11/04* | (2006.01) | |
| *E04B 9/00* | (2006.01) | |
| *F04D 25/08* | (2006.01) | |

(52) U.S. Cl.
CPC .......... *F04D 29/601* (2013.01); *E04B 9/006* (2013.01); *F16M 11/04* (2013.01); *F04D 25/088* (2013.01)

(58) Field of Classification Search
None
See application file for complete search history.

(56) References Cited

U.S. PATENT DOCUMENTS

| 1,878,084 | A | * | 9/1932 | Winkler | ................. | F21V 21/02 |
|---|---|---|---|---|---|---|
| | | | | | | 362/439 |
| 2,757,817 | A | | 8/1956 | Egan | | |
| 3,040,926 | A | | 6/1962 | Palmer | | |
| 4,077,169 | A | | 3/1978 | Thaw et al. | | |
| 4,399,922 | A | | 8/1983 | Horsley | | |
| 4,645,158 | A | | 2/1987 | Manning | | |
| 5,762,223 | A | | 6/1998 | Kerr | | |
| 5,854,443 | A | * | 12/1998 | Reiker | .................... | H02G 3/20 |
| | | | | | | 174/58 |
| 6,956,169 | B1 | | 10/2005 | Shotey et al. | | |
| 7,476,807 | B1 | * | 1/2009 | Gretz | .................... | H02G 3/123 |
| | | | | | | 174/58 |
| 7,712,238 | B2 | * | 5/2010 | Sender | ..................... | G09F 7/22 |
| | | | | | | 40/473 |
| 8,714,506 | B2 | | 5/2014 | Korcz et al. | | |
| 10,174,913 | B2 | * | 1/2019 | Boulanger | ................ | F21K 9/20 |
| 2005/0121215 | A1 | | 6/2005 | Halbert | | |

(Continued)

OTHER PUBLICATIONS

International Search Report regarding international Application No. PCT/US 20/13731 dated Apr. 16, 2020; 19 pages.

*Primary Examiner* — Steven M Marsh
(74) *Attorney, Agent, or Firm* — Clement Cheng

(57) ABSTRACT

Bracketry comprising an L-bracket, a T-bracket, and a joist hanger assembly, and methods of installation of the bracketry that eliminate the need to install a heavier duty electrical junction box and the difficulty of removing and reinstalling wiring in a new electrical junction box or fabricate bracing structure at the jobsite when performing a heavy ceiling fan or lighting fixture retrofit have been presented. The bracketry and installation methods are intended to reduce the cost and complexity of performing a retrofit installations.

5 Claims, 48 Drawing Sheets

(56) References Cited

U.S. PATENT DOCUMENTS

2006/0016948 A1    1/2006   Herth
2006/0032651 A1    2/2006   Johnson
2010/0020551 A1    1/2010   Kay
2010/0078532 A1    4/2010   Whipple
2014/0197165 A1    7/2014   Korcz et al.

* cited by examiner

BRACKETRY FOR CEILING FAN OR LAMP RETROFITS AND METHOD OF INSTALLING SAME

CROSS-REFERENCES TO RELATED APPLICATION

This application claims the benefit of U.S. Provisional Application Ser. No. 62/792,656, filed Jan. 15, 2019 and entitled "EZ BRACKET 150," which is incorporated herein by this reference.

BACKGROUND OF THE INVENTION

Field of the Invention

This invention relates generally to retrofitting ceiling fans or heavy lighting fixtures in residential and commercial buildings and, in particular, to bracketry useful in performing such retrofits and to methods of installing such bracketry.

BACKGROUND ART

Ceiling fan and/or light fixture retrofitting is the practice of replacing previously installed fans or lights with, generally, improved fixtures. Retrofits are typically performed to replace older, less energy efficient fixtures, with newer more energy efficient fixtures, to improve the appearance of interior rooms, or simply to replace nonworking fixtures.

Typically, the electrical wiring for ceiling fans and lighting fixtures is installed shortly after the framing for a residential or commercial building is completed. That is, wiring is routed and installed in the framing structure and at each location where a fan or lighting fixture is to be installed in a ceiling, an electrical junction box is installed in the ceiling frame work adjacent to a joist, i.e. a major load carrying member in the framework for a ceiling. Generally, junction boxes are attached directly to a joist which provides support for the box. Subsequently, a ceiling fan or a lighting fixture is attached to each electrical junction box.

Replacing an existing ceiling fan or lighting fixture in an older residence or commercial building is often a time consuming and complex task because standard duty junction boxes are frequently made of either plastic or sheet metal and therefore often will not support the weight of a new ceiling fan or a heavy lighting fixture. This is particularly the case when a ceiling fan having large externally rotating blades is desired to be installed in place of an existing enclosed fan which typically uses relatively lightweight blades of plastic construction, or when a heavy lighting fixture will replace a relatively lightweight existing light fixture. In these situations, the existing plastic or sheet metal junction box is unable to support the weight of the new fixture. Therefore, in order to use the existing junction box, bracing to support the new fixture must be fabricated at the job site. Additional electrical work will often also be required. Alternatively, a heavy duty junction box can be installed. In the case of installing a heavy duty junction box however, the preexisting junction box must be removed and additional wiring work for installation of new heavy duty junction box is required.

The complexity of a fan or lighting fixture retrofit is affected by whether the building is single story structure or multi-story structure, among other factors. In single story structures, or the uppermost story of a multi-story structure, access to the joists in the ceiling may often be available from a location above the joists in an unfloored attic or crawl space above the ceiling.

In the case of single story buildings with a floored attic or multi-story buildings however, an installer may be unable to access the joist space from above the joists as the joists are used to support the flooring of either the attic (in the case of a floored attic) or of the floor of the next higher story, in the case of multi-story structures. In these situations it is not possible to access the joists from above and typically is it not possible to suspend fixture supporting structure from the top of the joists.

The above-described joist access situations require an electrician or installer to keep in inventory a variety of bracing materials and loose parts for custom fabrication of bracing structure at the a job site when performing a ceiling fan or lighting fixture retrofit.

In most retrofit installations, particular those involving the installation of more energy efficient fixtures, a consumer conducts a cost benefit analysis. The larger the cost of retrofit components and the longer and more costly the installation, the less likely that a retrofit solution for more energy efficient fixtures will make economic sense for a building owner. A similar cost benefit analysis takes place when a building owner desires to replace existing fixtures for primarily esthetic reasons.

There is a need in the art for improved components and methods of retrofitting ceiling fans and lighting fixtures in residences and commercial buildings. Ideally, such improved components would be relatively simple and relatively easy to install, and would eliminate the need to either install a heavy duty junction box or fabricate bracing structure at the jobsite when performing an installation.

SUMMARY OF THE INVENTION

The present invention meets a long-felt need in the art by providing bracketry and methods of installation that eliminate the need to install a heavy duty junction box or fabricate bracing structure at the jobsite when performing a ceiling fan or lighting fixture retrofit. As such, the bracketry and methods of the present invention substantially reduce the complexity and cost of performing a retrofit installation.

The bracketry of the present invention comprises an L-bracket, a T-bracket, a joist hanger assembly, and a cross-bracket assembly. The L and T-brackets are well-suited for use in situations where no space is present in a ceiling to suspend a retrofit ceiling fan or light fixture from above the joists. The L and T-brackets are intended to support ceiling fans with large externally rotating blades or heavy light fixtures.

The joist hanger assembly is an alternative to the L and T-brackets that may be used in situations where space is available above the joists. The joist hanger assembly is particularly useful where space is available above the joists and the existing junction box is not directly mounted to a ceiling joist. The joist hanger assembly is capable of supporting very heavy fixtures, such as an unusually large ceiling fan or chandelier.

The cross-bracket assembly is used where an electrical junction box has been installed between two ceiling joists and the joists are not accessible from above the ceiling.

The L-bracket is intended to be used to suspend heavy ceiling fans or heavy light fixtures from a ceiling. The L-bracket includes a first or short arm and a second or long arm. The short arm is configured to abut the interior side wall of the junction box at the point where the junction box is attached to the supporting joist. The short arm is attached to the joist via screws where the screws pass through the side wall of the junction box and into the adjacent joist. The long arm of the L-bracket is predrilled with threaded holes spaced to accommodate a majority of fixture mounting brackets for commonly available ceiling fan and lighting fixtures.

The L-bracket may be installed as follows. The preexisting fixture is removed from the ceiling. The wiring in the junction box is moved to the side opposite the side where the junction box abuts or is attached to the joist to make room for the L-bracket. The L-bracket is placed within the junction box with the short arm abutting the wall of the junction box adjacent to the joist. The long arm will extend beyond the junction box onto the drywall of the ceiling. A mark is drawn or scribed around the portion of the long arm of the L-bracket that extends onto the ceiling drywall and the portion of the drywall interior the scribe line is cut or notched out. The cutout allows the L-bracket to be flush with the ceiling upon installation.

The L-bracket is placed inside the preexisting junction box on the side of the box adjacent to the joist and is attached to box and joist by driving screws directly through the junction box and into the joist. Preexisting junction boxes are typically made either of plastic or sheet metal. Drilling pilot holes is not required in the case of plastic junction boxes, but may be necessary in the case of sheet metal junction boxes. Subsequently, the retrofit ceiling fan or lighting fixture is attached to the L-bracket.

The T-bracket may also be used to suspend heavy ceiling fans or heavy lighting fixtures from a ceiling. The T-bracket is particularly useful where a heavy retrofit fixture is desired to be installed and there is no access to the joists from above the ceiling. The T-bracket comprises an angle element and a fixture element, where the angle element is removably attachable to the fixture element. The angle element serves to mount the T-bracket to a joist. The fixture element attaches the mounting bracket of a ceiling fan or light fixture to be retrofit to the T-bracket. The T-bracket is configured to position the load of a retrofit fixture close to a supporting joist. The fixture element of the T-bracket includes predrilled holes spaced to be compatible with a majority of heavy ceiling fans and lighting fixtures on the market.

The T-bracket is installed as follows. An assembled T-bracket is positioned in a junction box such that the angle element is placed against the junction box on the side that is adjacent to, or attached to, the joist. Once in position, a portion of the fixture element will extend outside of the junction box along the drywall of the ceiling. The outline of the portion of the fixture element extending outwards of the junction box is marked on the drywall and the portion of the drywall interior of the outline is cut or notched out of the drywall. The drywall is cut out so that the fixture element of the T-bracket will be flush with the ceiling when the T-bracket is attached to the joist.

After the drywall is cut out, the T-bracket is disassembled and the angle element is installed. The angle element is attached to the joist by driving screws though the holes in the angle element, through the wall of the junction box and into the joist. Where the junction box is made of plastic, pilot holes are not necessary, but may be used if desired. In the case of a sheet metal junction box, drilling pilot holes may be necessary. As is the case with the L-bracket, the holes in the angle element of the T-bracket are countersunk to allow the screws to be driven at an angle.

After the angle element is attached to the joist, the fixture element is attached to the angle element. The mounting bracket of a heavy fixture to be retrofit may now be installed on the fixture mount of the T-bracket.

The joist hanger assembly comprises a cross brace having a plurality of clearance holes, a hanger rod, and a fixture interface bracket. In the joist hanger assembly, the hanger rod is attached at one end to the cross brace and at another end to the fixture interface bracket. The joist hanger assembly may be used where there is sufficient space above the joists to place the cross brace. These situations most commonly occur where the junction box was not originally installed adjacent to a joist.

The joist hanger assembly is typically installed as follows. A clearance hole for the hanger rod is drilled in the center of the preexisting junction box. (Preexisting wiring is moved out of the way, if necessary.) The fixture interface bracket is installed on a first end of the hanger rod and a second end of the rod is inserted through the clearance hole previously drilled in the junction box. The fixture interface bracket is temporarily attached to the junction box. The cross brace is suspended over the joists above the junction box and is positioned such that the second end of the hanger rod is disposed through one of the plurality of clearance holes in the brace. The second end of the hanger rod is then attached to the cross brace and the depth of the hanger rod is adjusted such that the fixture interface bracket abuts the junction box. The cross brace is then secured to the joists. The screw holding the fixture interface bracket to the junction box is then removed and a retrofit ceiling fan or lighting fixture is attached to the interface bracket.

The cross-bracket assembly comprises two brackets, the first being a joist attachment bracket and the second being a cross bracket. The joist attachment bracket is flat bracket having a length sized to span the distance between ceiling joists and a width and thickness sized to support a relatively heavy ceiling fixture. The joist attachment bracket includes a plurality of holes, spaced along a longitudinal centerline of the bracket, and a slot at each end of the bracket. The slots serve to allow the joist attachment bracket to be attached to joists via a fastener.

The cross-bracket is also a flat bracket having a length sized to span the diameter of round electrical junction boxes or the diagonal width of square electrical junction boxes. The cross-bracket includes a center hole which allows it to be attached via a fastener to one of the plurality of holes in the joist attachment bracket. The ends of the cross-bracket include slots which are used to attach the cross bracket existing holes in electrical junction box via fasteners. The slots provide adjustability to accommodate a variety of ceiling fixture bolt patterns.

The cross-bracket assembly is attached to a ceiling, generally, as follows. First an existing ceiling fixture is removed from a ceiling exposing a previously installed electrical junction box. Next, the ceiling joists closest to the junction box are located. Electronic devices that use capacitance, radar or other technologies specifically designed to located joists and studs are commercially available. Alternatively, the joists may be located with a screw driver or like tool, as is known to those of skill in the art.

Next, the cross-bracket is assembled to the joist attachment bracket via a fastener such that cross-bracket is attached the junction box, also via fasteners. The joist attachment bracket is then positioned such that it spans the previously located joists on each side of the junction box. An installer then scribes a line around the joist attachment bracket. The cross-bracket and attached joist attachment bracket are removed and the installer then cuts away the ceiling drywall until the joists are exposed. Notches, if needed, are then cut in the electrical junction box such the joist attachment bracket will lay flat across the junction box and the joists, when installed.

Next, the cross-bracket with the joist attachment bracket attached, is reattached the junction box. Subsequently, the joist attachment bracket is secured to each joist via a fastener. A new ceiling fixture or fixture bracket is then attached to the joist attachment bracket by means of spacers (where needed) and fasteners. In a typical, installation, the cutout in the ceiling drywall will be patched for aesthetic reasons, using commercially available drywall patching materials known to those of skill in the art.

When retrofit ceiling fan or lighting fixtures are installed using the brackets and methods of the present invention, the weight of the retrofit fixture is transferred by the brackets or hanger assembly to the joist (or joists in the case of the hanger assembly), thereby eliminating the need to either install a heavy duty junction box (and associated rewiring) or fabricate bracing to support the retrofit fixture. Therefore, the bracketry and installation methods of the present invention reduce the time require to install a retrofit fixture and consequently the cost of such an installation. Reduced installation costs encourage building owners to install more energy efficient or more esthetically pleasing fixtures.

The above and other advantages of the bracketry and installation methods of the present invention will be described in more detail below.

BRIEF DESCRIPTION OF DRAWINGS

FIG. 7O a perspective view of an installer attaching a ceiling fixture to the joist attachment bracket of the present invention using spacers and fasteners.

DETAILED DESCRIPTION OF THE PREFERRED EMBODIMENTS

The present invention will now be described more fully hereinafter with reference to the accompanying drawings, in which preferred embodiments of the invention are shown. The invention however, may be embodied in many different forms and should not be construed as being limited to the embodiments set forth herein. Rather these embodiments are provided so that this disclosure will be thorough and complete, and will fully convey the scope of the invention to those skilled in the art. Like numbers refer to like elements throughout.

The present invention comprises bracketry and installation methods for use in retrofitting heavy ceiling fans or ceiling lighting fixtures. The bracketry and methods presented allow installers to use pre-existing standard or light duty electrical junction boxes and thereby eliminate the need to install and wire a heavy duty junction box or fabricate custom bracing at a job site. More specifically, the embodiments include an L-bracket 10 and method of installation, a T-bracket 20 and method of installation and, a joist hanger assembly 30 and method of installation.

The L-Bracket

Figure 1A:
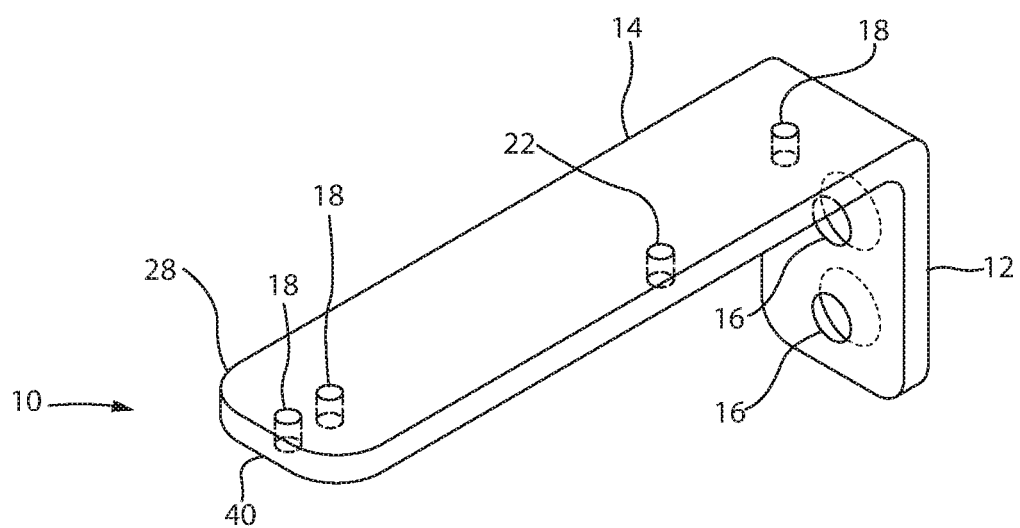
FIG. 1A is a front perspective view of the L-bracket of the present invention.
Figure 1B:
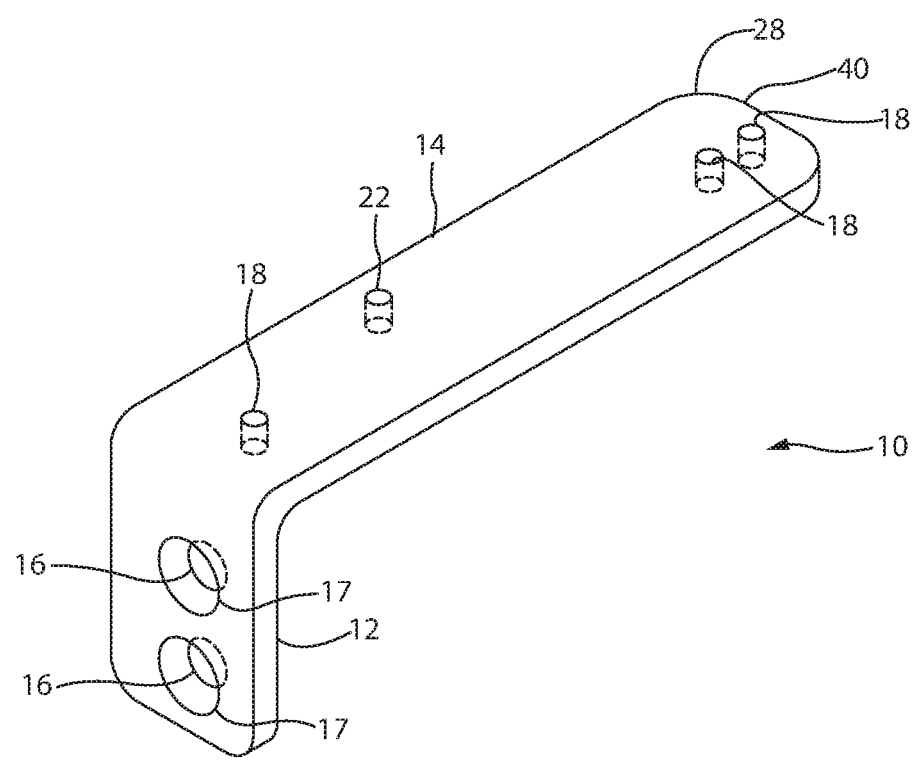
FIG. 1B is a rear perspective view of the L-bracket of the present invention.
Figure 2A:
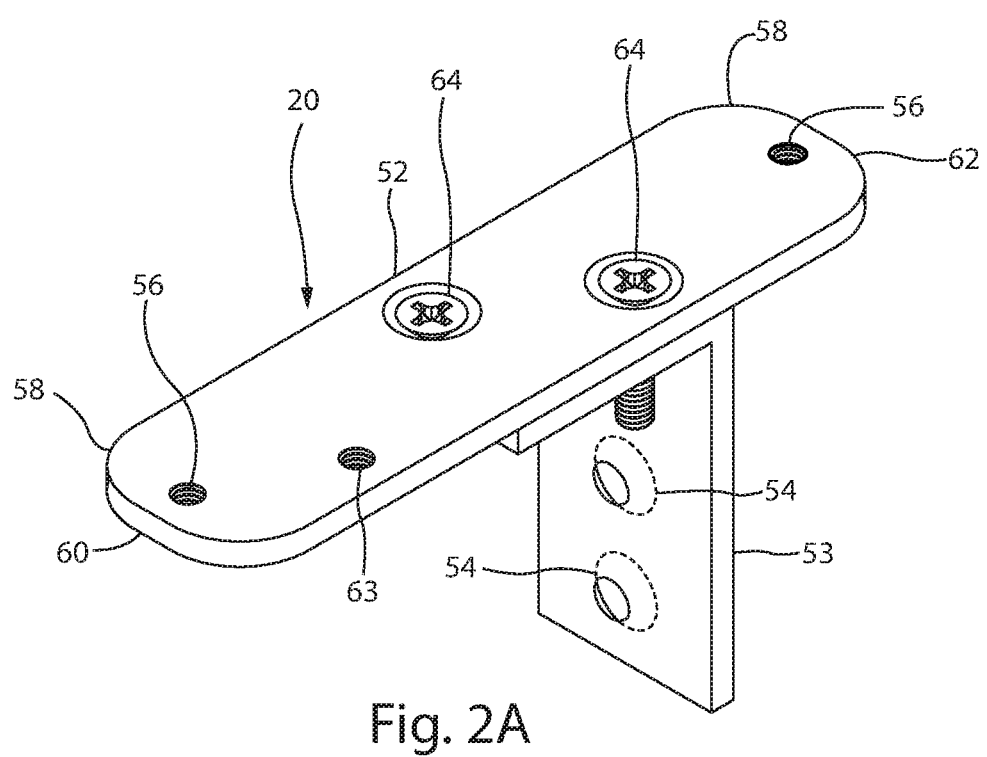
FIG. 2A is a front perspective view of the T-bracket of the present invention.
Figure 2B:
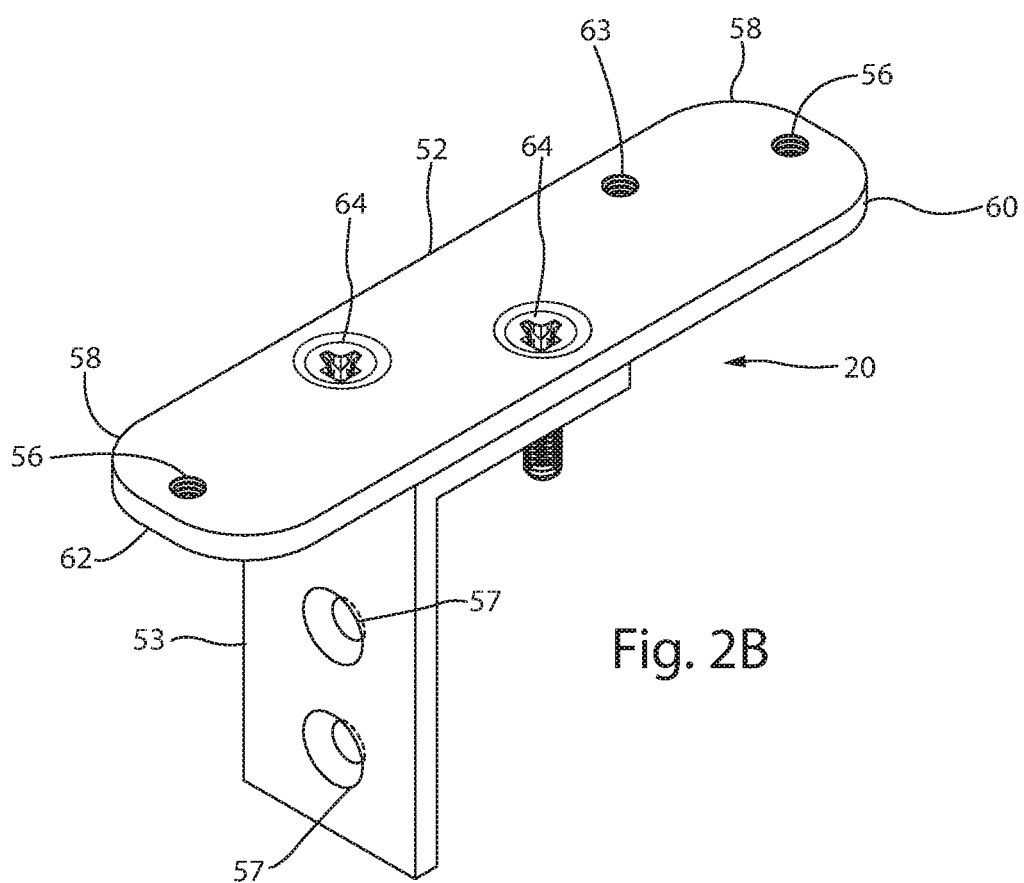
FIG. 2B is a rear perspective view of the T-bracket of the present invention.
Figure 2C:
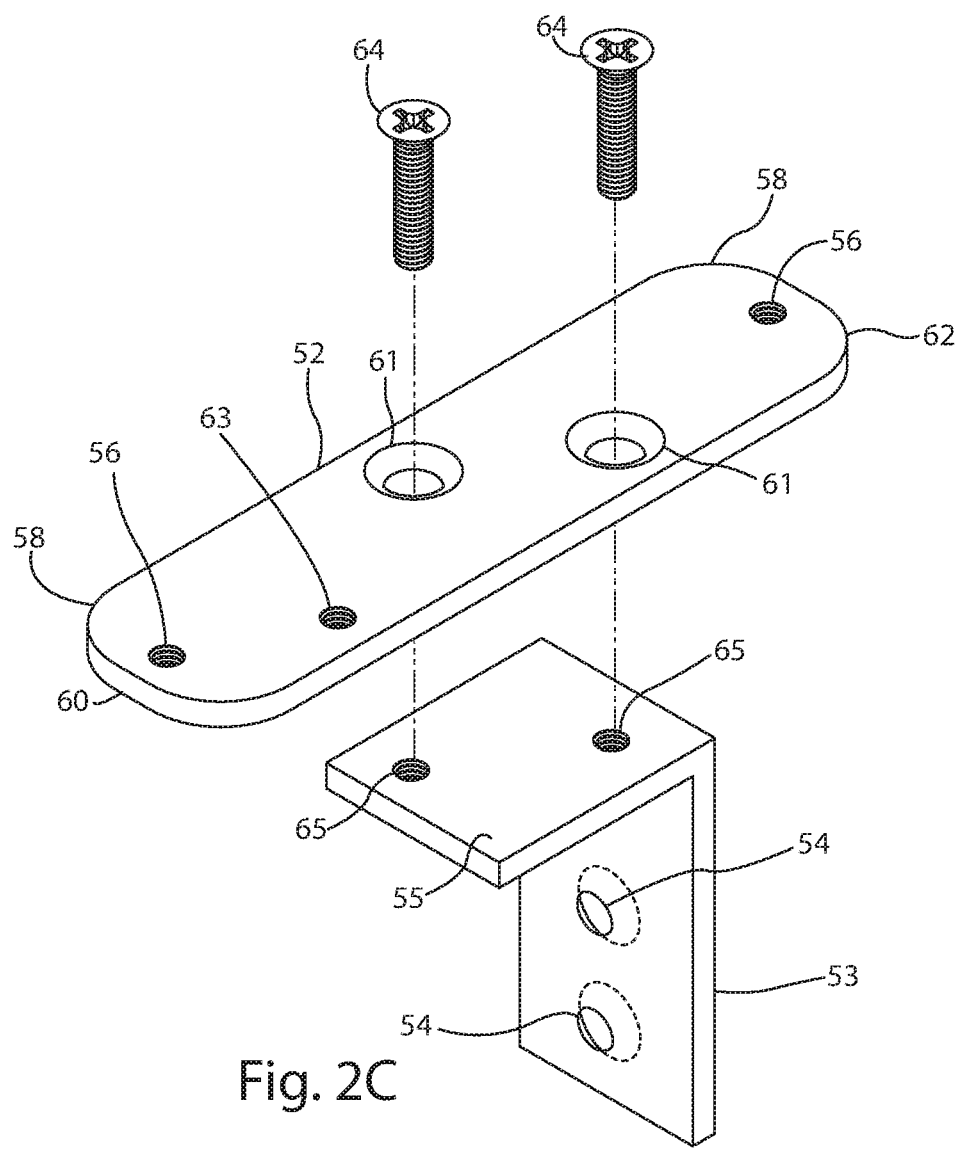
FIG. 2C is an exploded, front perspective view of the T-Bracket of FIG. 2A.
Figure 3A:
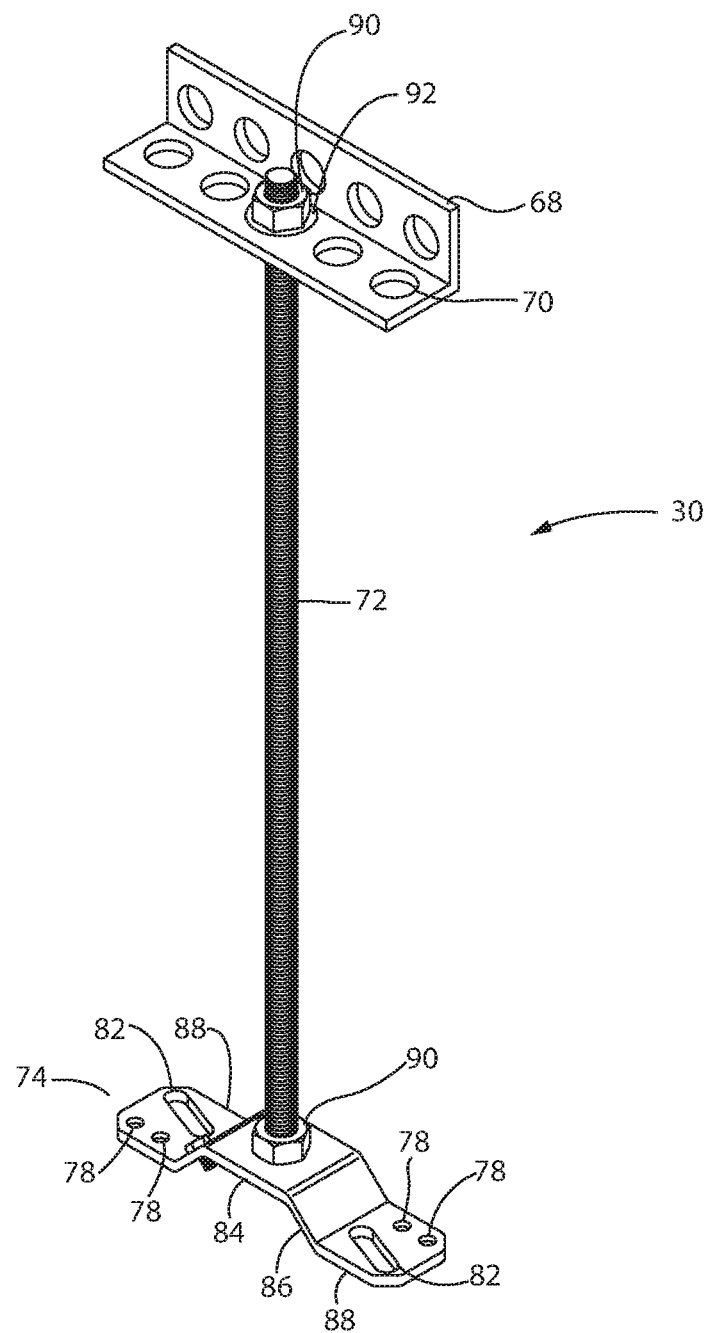
FIG. 3A is a perspective view of the joist hanger assembly of the present invention.
Figure 3B:
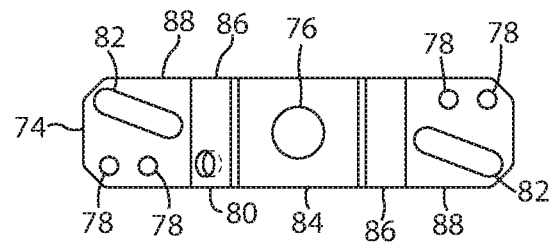
FIG. 3B is a top view the fixture interface bracket of the joist hanger assembly of FIG. 3A.
Figure 3C:
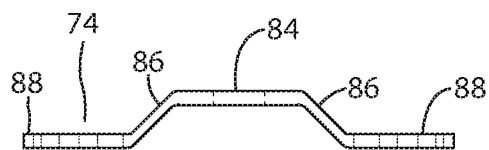
FIG. 3C is a side view of the fixture interface bracket of the joist hanger assembly of FIG. 3A.
Figure 3D:
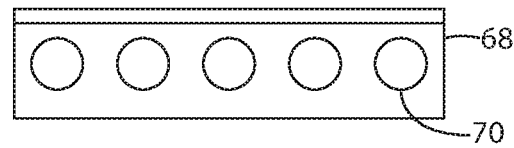
FIG. 3D is a top view of the cross brace of the joist hanger assembly of FIG. 3A.
Figure 3E:
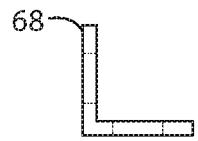
FIG. 3E is side view of the cross brace of the joist hanger assembly of FIG. 3A.
Figure 4A:
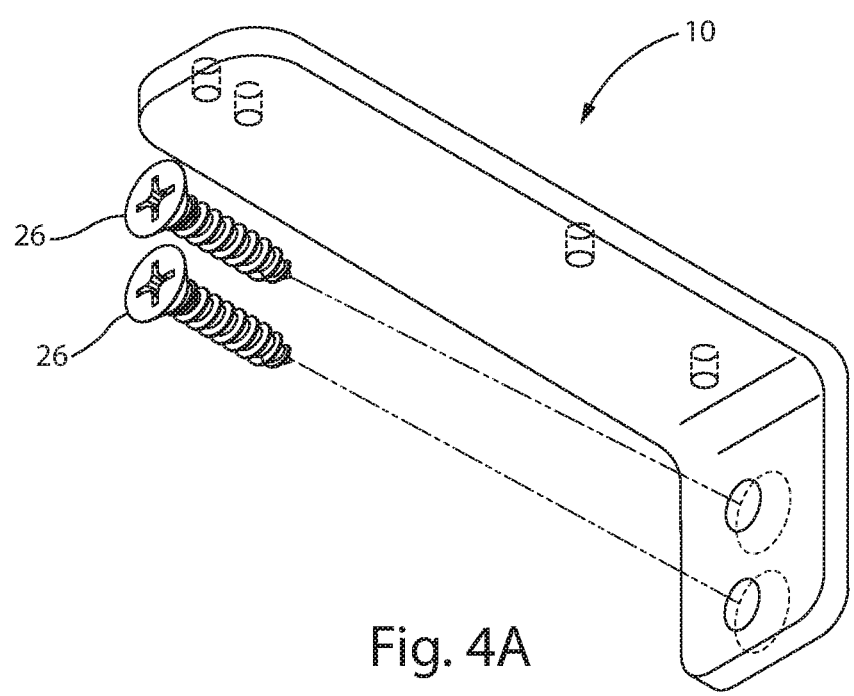
FIG. 4A is a front perspective view of the L-bracket of FIG. 1A showing the wood screws used to attach the L-bracket to a joist.

With reference to FIGS. 1A, 1B and 4A, the L-bracket 10 of the present invention includes a first arm 12 and a second arm 14. The first arm 12 of the L-bracket 10 includes two countersunk mounting holes 16, which allow the L-bracket 12 to be mounted to a joist 24 via wood screws 26 (see FIG. 4A). The countersunk holes 16 are through-holes. The use of countersunk holes allows the wood screws 26 to be installed at an angle. It should be noted that the countersinks 17 are placed on a side of the first arm 12 that abuts a junction box 36, i.e. on the side opposite the side from which the wood screws 26 first pass through the first arm 12 of the L-bracket 10. (See FIG. 4A.)

The second arm 14 of the L-bracket 10 includes three fixture bracket mounting holes 18 and a ground screw hole 22. The fixture bracket mounting holes 18 are drilled and tapped with screw threads, as is the ground screw hole 22. The fixture mounting bracket holes 18 are spaced to be compatible with the hole spacing of standard heavy duty electrical junction boxes, which correspond to the mounting hole spacing on most mounting brackets included with heavy ceiling fans or lighting fixtures. To reduce snagging on wiring, the long arm 14 of the L-bracket 10 may optionally include radiused corners 28.

The L-bracket is suitable for mounting ceiling fans and heavy lighting fixtures to a joist, regardless of whether the joist is accessible from above the ceiling. In the exemplary embodiment, the L-bracket 10 is fabricated from 3/16" steel flat stock. The second arm 14 is approximately 4" long by 1" wide and, the first arm 12 is approximately 2" long by 1" wide. The mounting holes 16 in the first arm 12 are 1/4" diameter through-holes with a 3/8" countersink. The fixture bracket mounting holes 18 in the second arm 14 are 10-32 threaded holes. The radiused ends 28 have a 0.187" radius. The above dimensions are provided for reference only. The utility of the L-bracket is not dependent on any particular dimensions or on any particular type of material. The bracket's dimensions and materials can vary from those provided above, while still allowing the bracket to serve its intended purpose.

Installation of the L-Bracket

With reference to FIGS. 4A to 4I, installation of the L-bracket in an exemplary ceiling fan or lighting fixture retrofit installation in a representative ceiling will be described in more detail. FIGS. 4B-4I show, in schematic form, among other items, a representative drywall ceiling 34, a representative electrical junction box 36, representative junction box wiring 38, and representative ceiling framing joists 24.

Figure 4B:
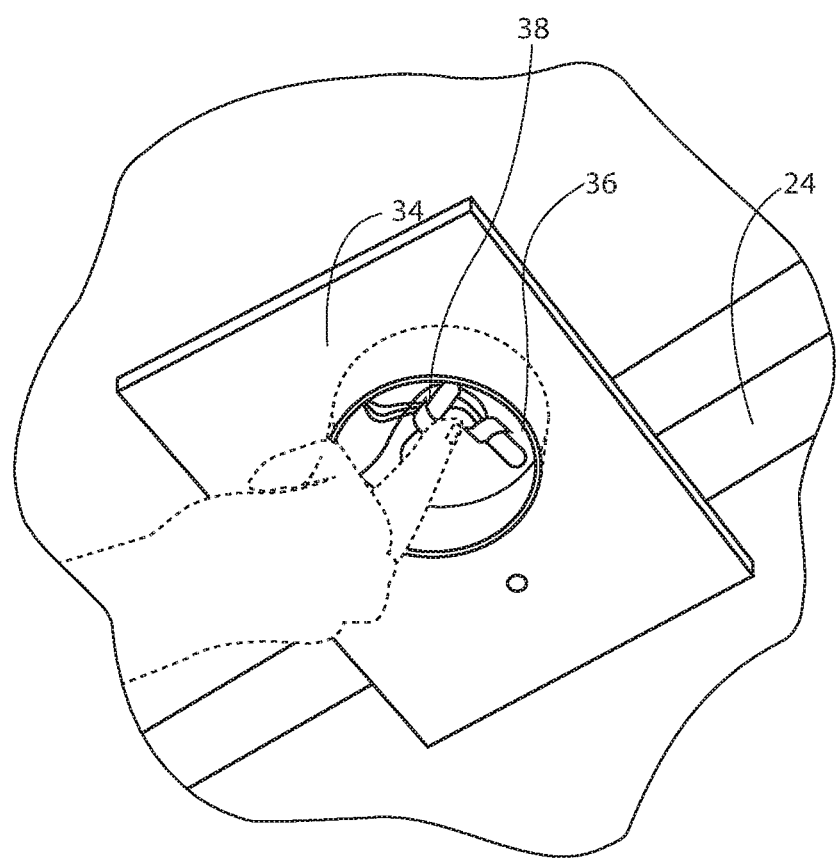
FIG. 4B is a perspective view of a ceiling and an electrical junction box installed therein, partially cutaway to show adjacent joists.

With reference to FIG. 4B, in step 1, the preexisting ceiling fan or lighting fixture 32 (not shown) is removed from the ceiling. In step 2, upon removal of the preexisting fixture 32, the wiring 38 in the electrical junction box 36 is moved to one side, if necessary, to make room for the L-bracket 10.

Figure 4C:
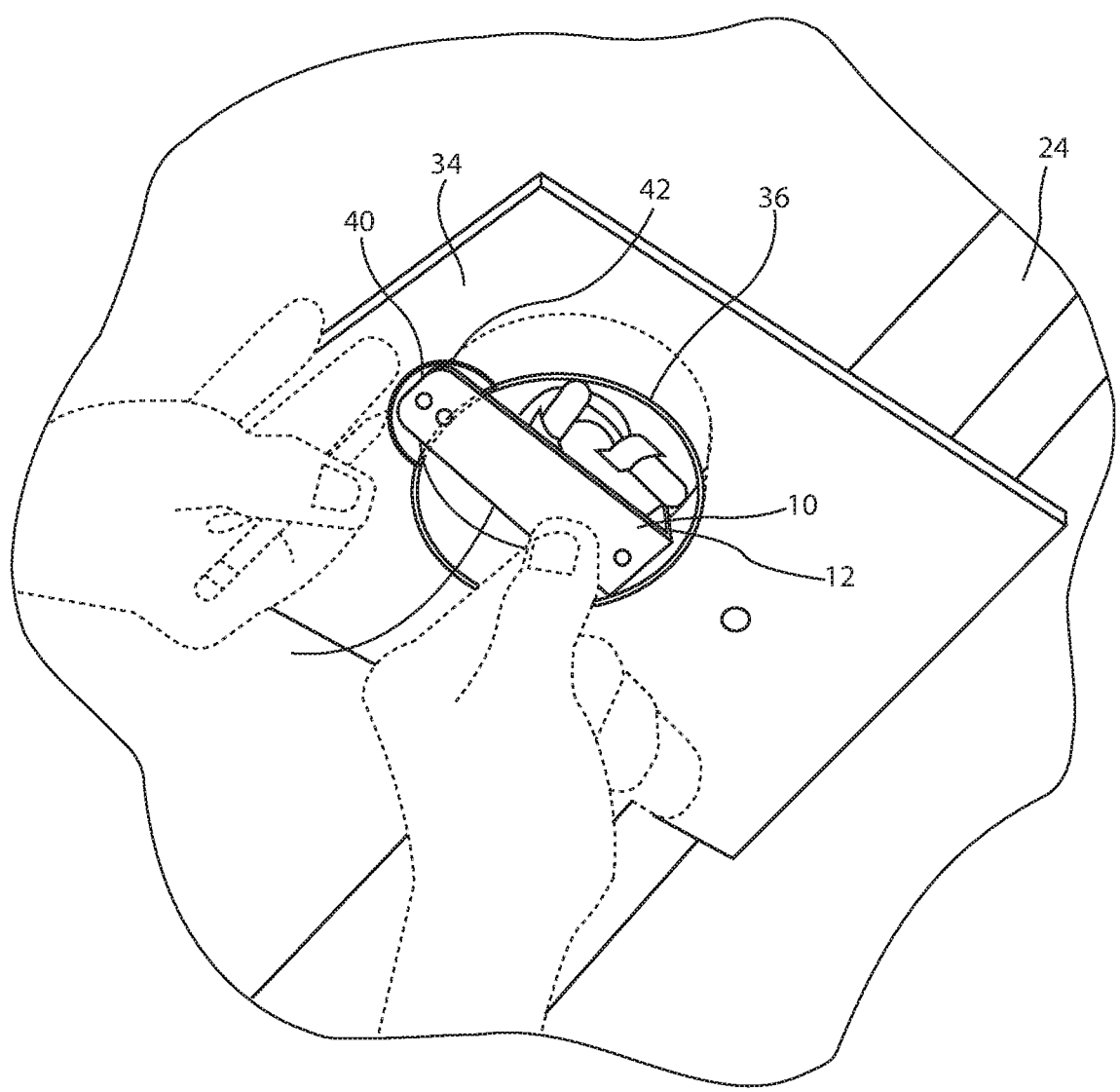
FIG. 4C is a perspective view of the L-bracket of FIG. 1A held within the junction box depicted in FIG. 4A showing an installer scribing a line about a portion of the L-bracket.

With reference to FIG. 4C, in step 3, the L-bracket 10 is placed within the junction box 36. The first arm 12 of the L-bracket 10 is positioned against a wall of the junction box on the side adjacent the joist 24. In this position, a free end 40 of the second arm 14 of the L-bracket 10 extends over the ceiling drywall 34. An installer marks a scribe line 42 around the free end 40 of the second arm 12.

Figure 4D:
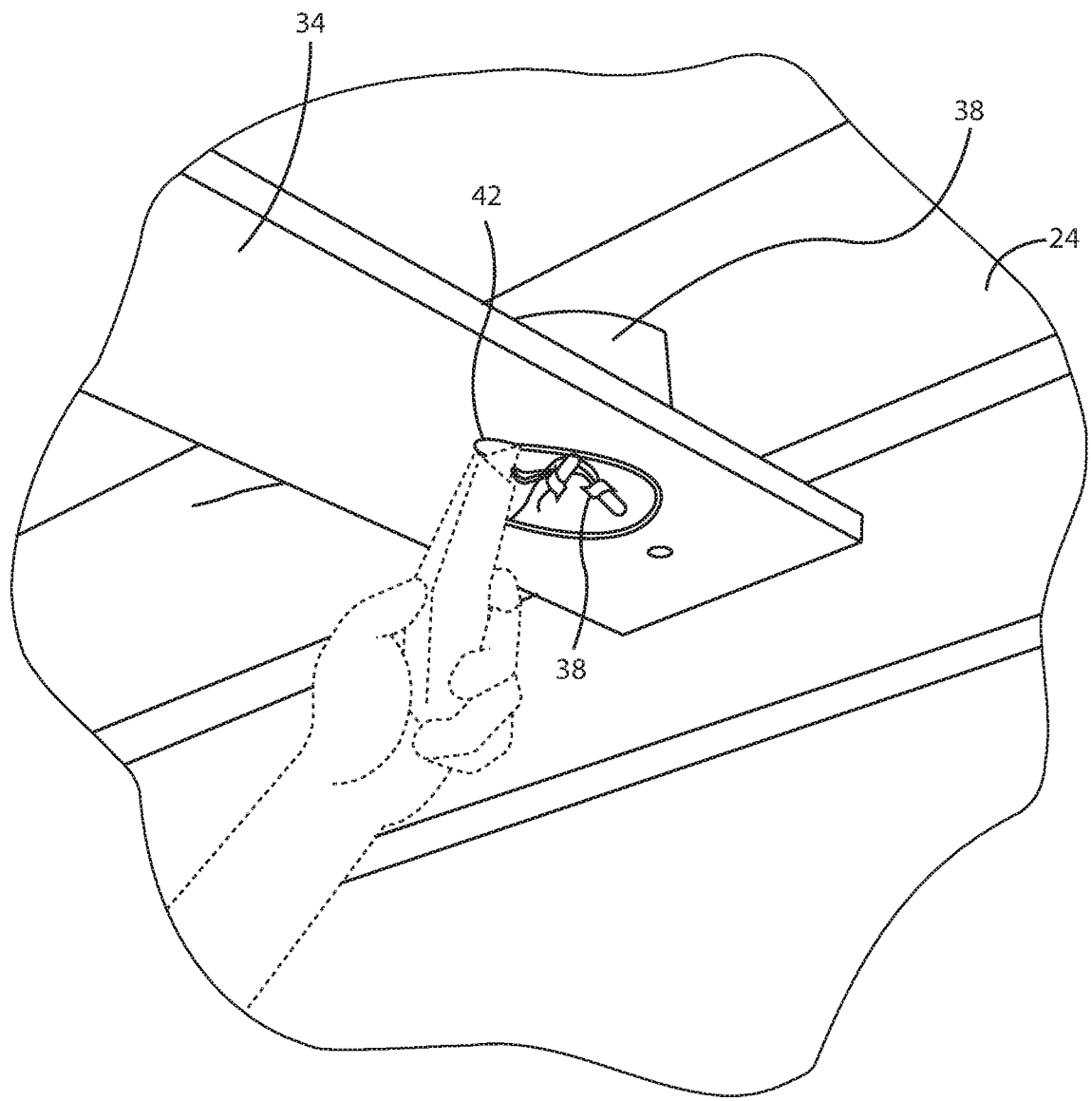
FIG. 4D is a perspective view showing an installer cutting out a portion of ceiling drywall interior of the scribe line depicted in FIG. 4C.
Figure 4E:
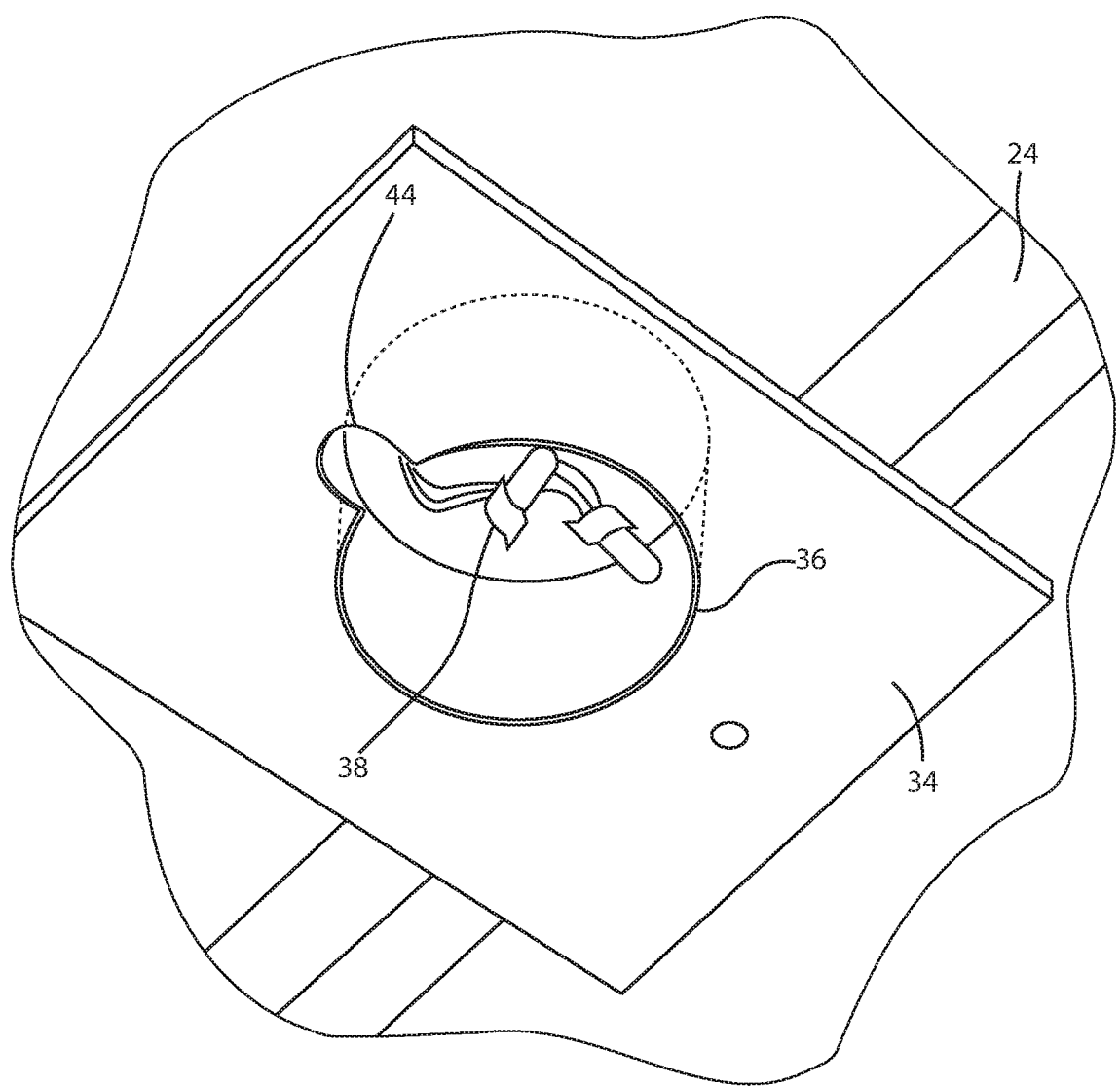
FIG. 4E is a perspective view showing a cutout in the ceiling drywall, interior of the scribe line of FIG. 4C.

With reference to FIG. 4D, in step 4, an installer notches or cuts out the ceiling drywall 34 interior of the scribe line 42 to form a cutout 44 in the ceiling drywall 34. (See FIG. 4E.) The cutout 44 allows the L-bracket 10 to be mounted flush with the ceiling drywall 34.

Figure 4F:
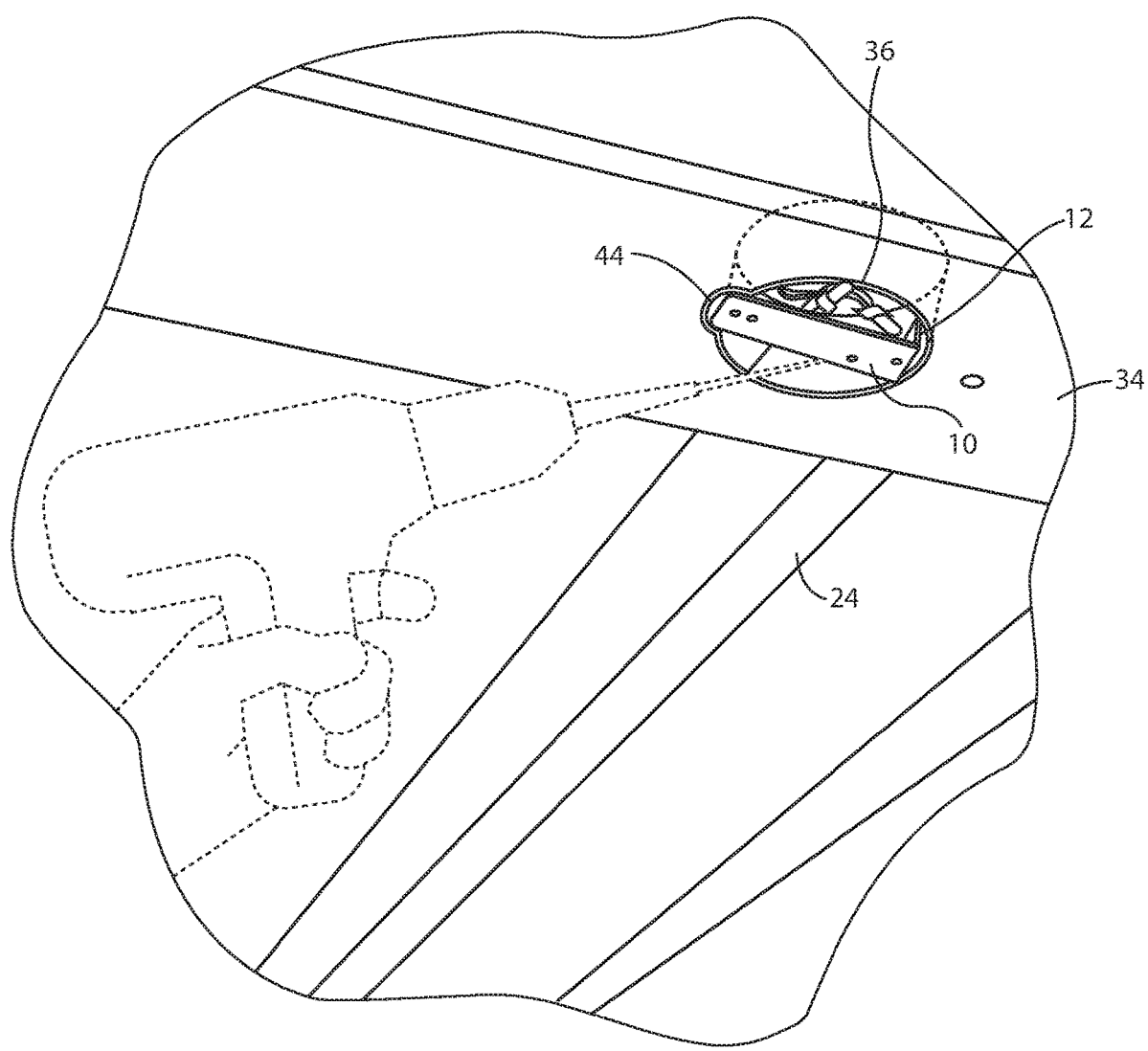
FIG. 4F is a perspective showing an installer attaching the L-bracket of FIG. 4A to a joist in a ceiling by driving the wood screws through a pre-existing electrical junction box.
Figure 4G:
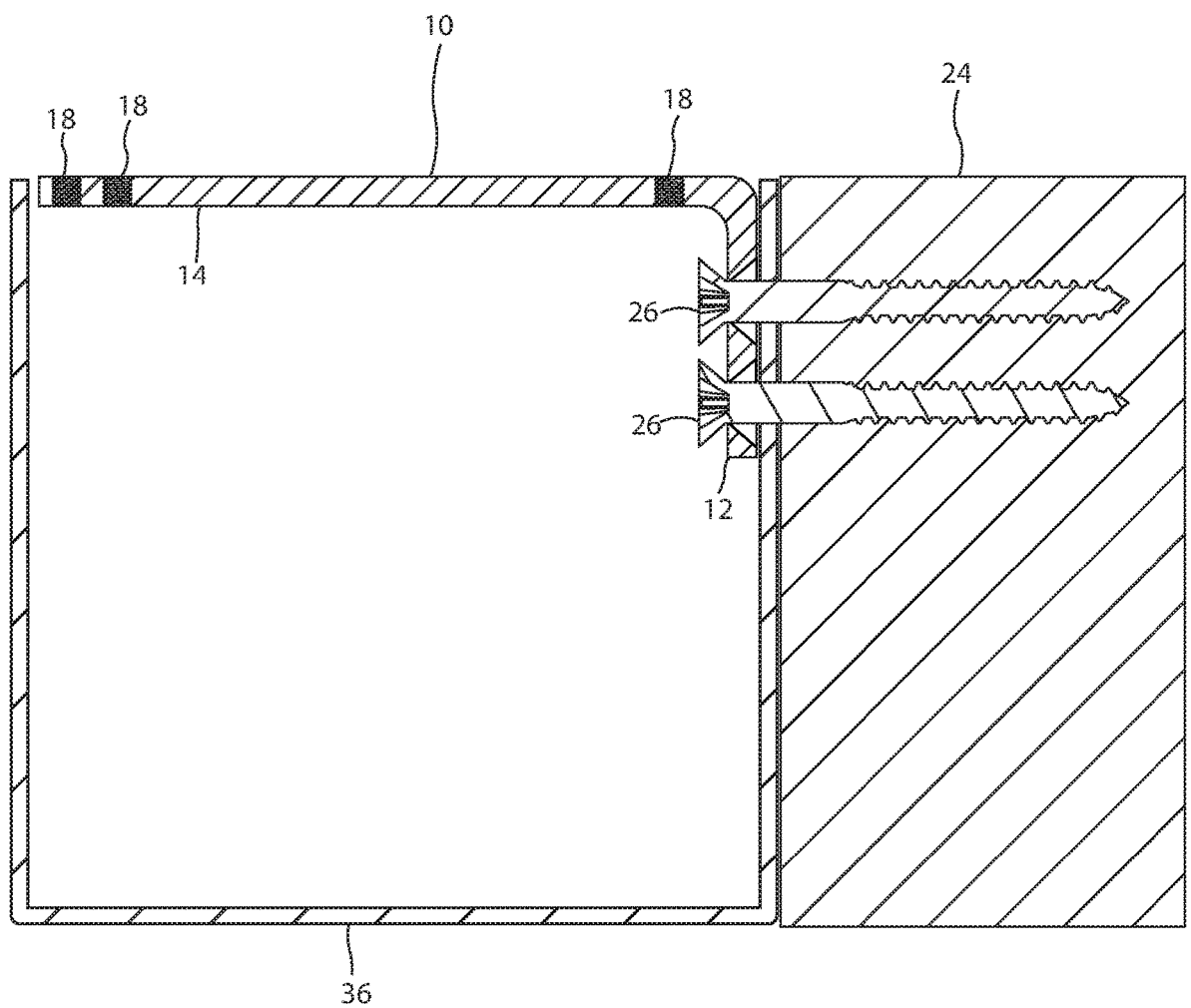
FIG. 4G is cross-sectional view showing an L-bracket attached to a joist through the wall of an electrical junction box.

With reference to FIGS. 4A, 4F and 4G, in step 4, the installer attaches the L-bracket 10 to the ceiling joist 24 by driving wood screws 26 through the countersunk mounting holes 16, through the wall of the junction box 36, and into the joist 24. FIG. 4A illustrates the wood screws 26 and FIG. 4G depicts the L-bracket attached to the joist 24. Experimentation has demonstrated that wood screws can be driven though plastic junction boxes without the need for pilot holes. Pilot holes may be necessary in the case of a sheet metal junction box.

Figure 4H:
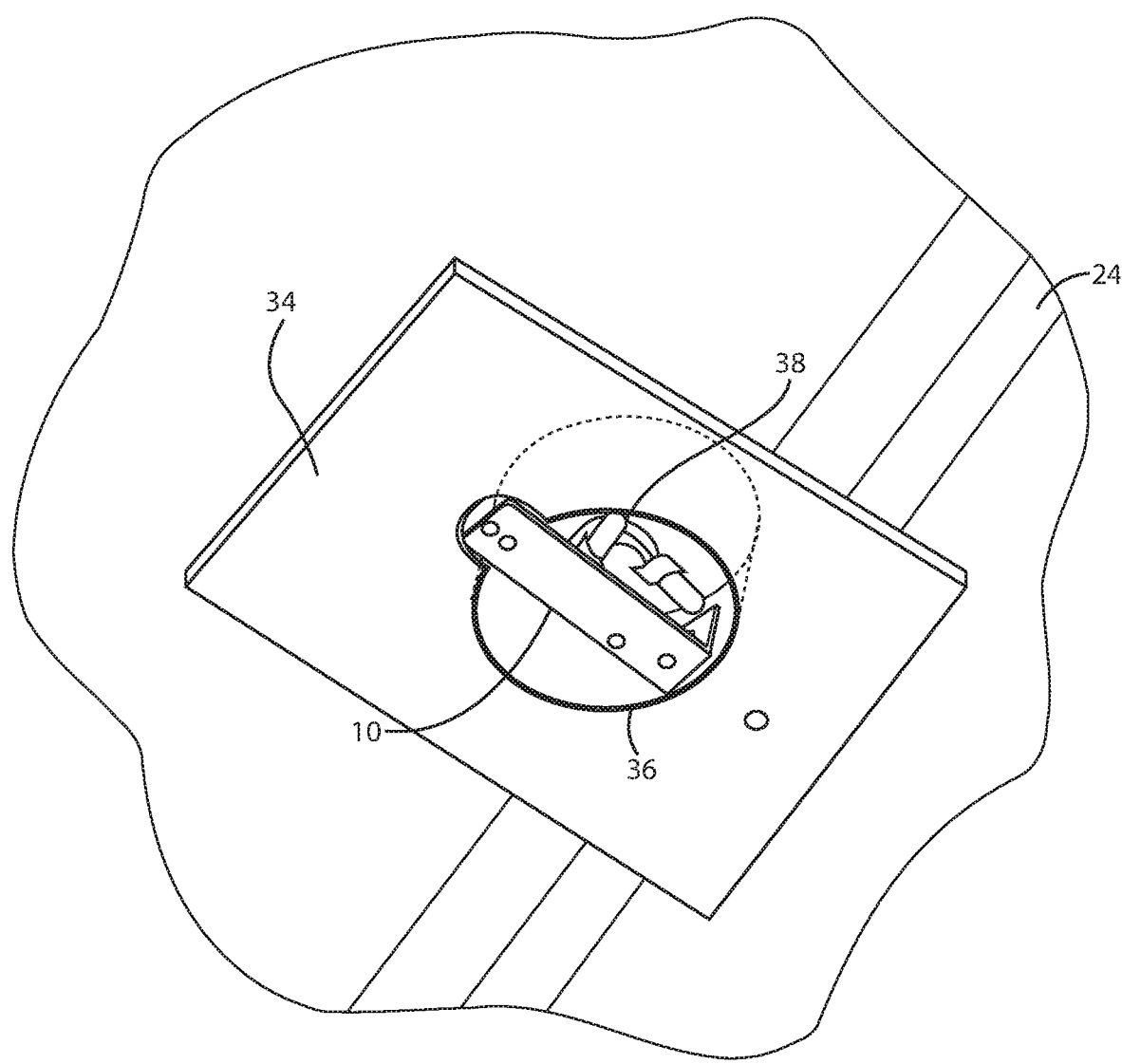
FIG. 4H is a perspective view showing the L-bracket of FIG. 1 installed in a ceiling.
Figure 4I:
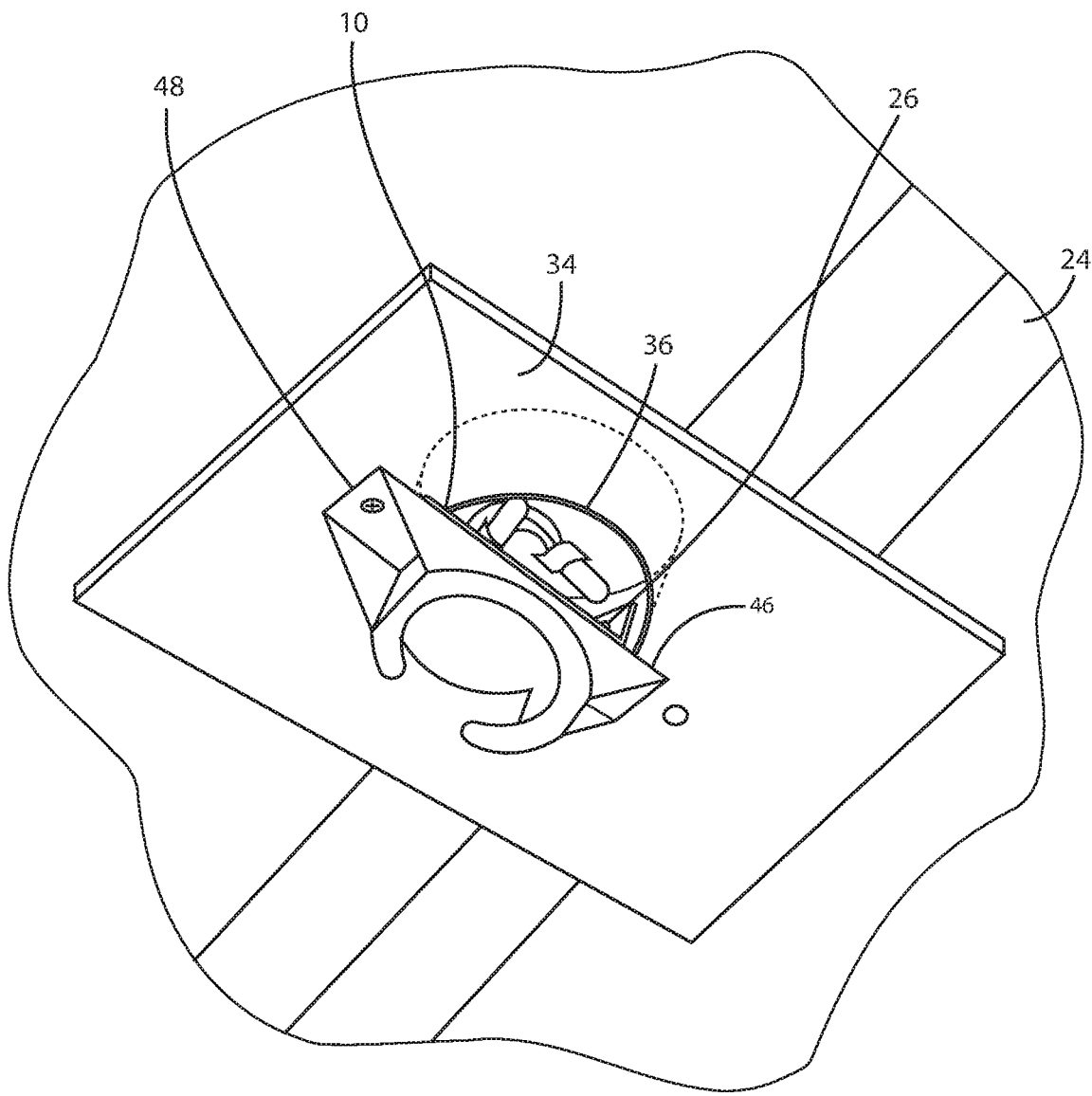
FIG. 4I is a perspective view showing a representative mounting bracket for a retrofit fan or lighting fixture attached to the L-bracket of FIG. 1A, installed in a ceiling.

With reference to FIGS. 4H and 4I, in step 5, a ceiling fan or lighting fixture mounting bracket 46 (shown in schematic form) is installed on the L-bracket 10 with threaded screws 48. The spacing of the threaded fixture mounting holes 18 corresponds to that of the mounting brackets for most commercially available heavy ceiling fans and lighting fixtures. The L-bracket 10 is equipped with a threaded hole 22 for a ground wire (see FIGS. 1A and 1B), which may be required in some installations.

L-Bracket—Alternative Embodiment

Figure 8A:
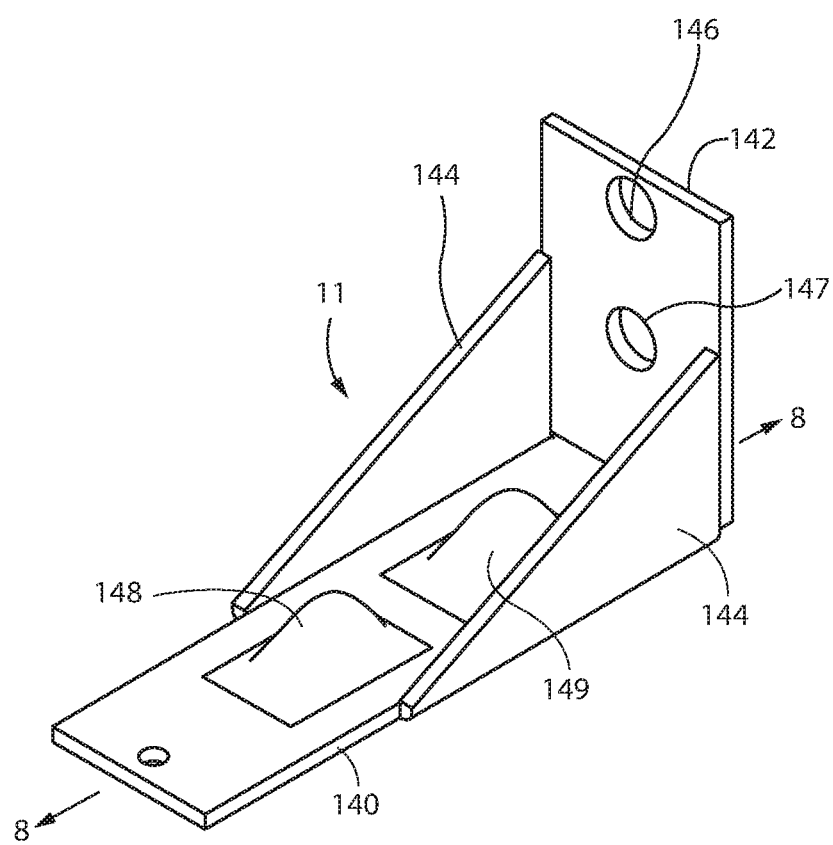
FIG. 8A is a rear perspective view of an L-bracket with gussets.
Figure 8B:
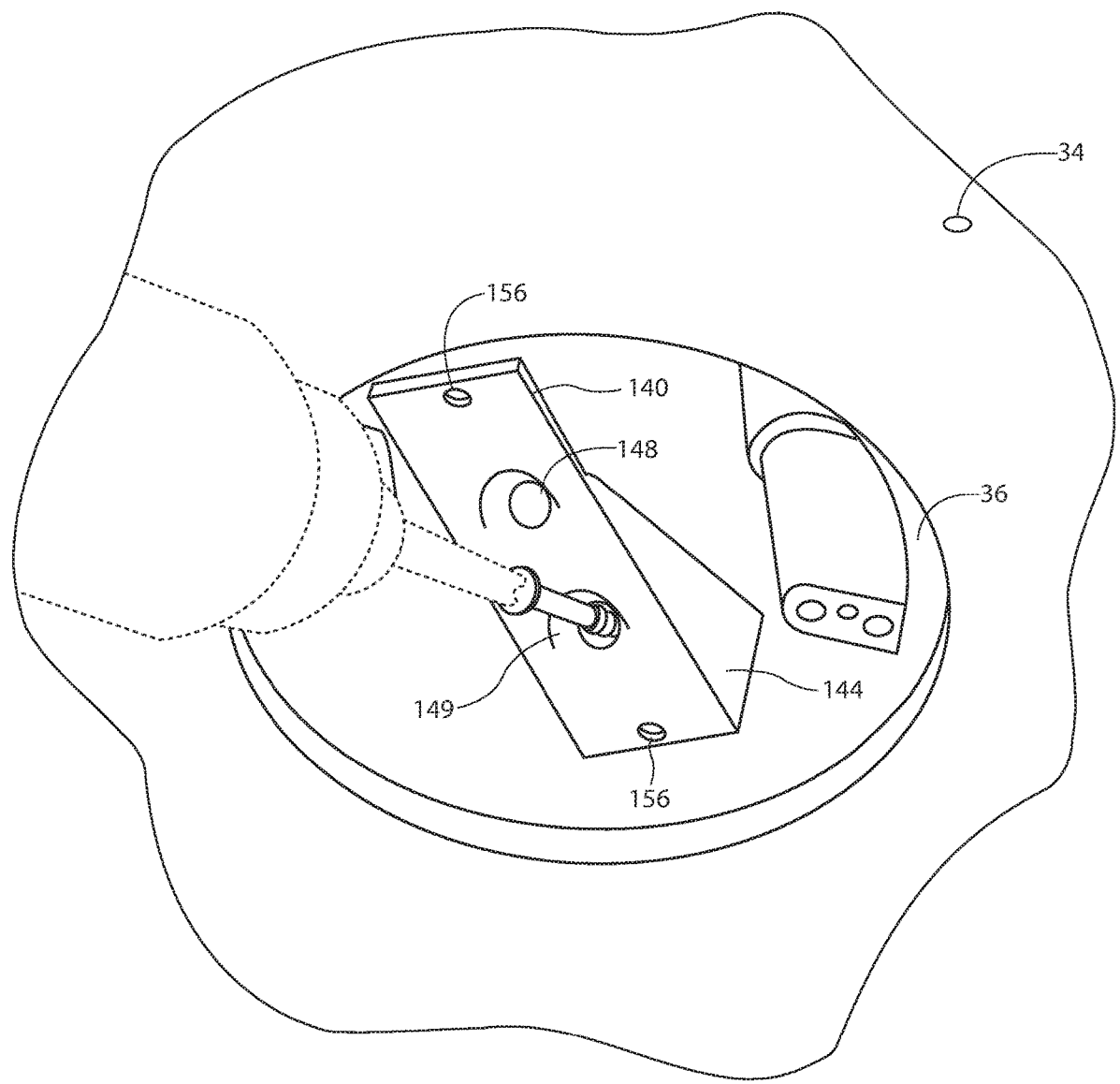
FIG. 8B is a front perspective view of an L-bracket with gussets.
Figure 8C:
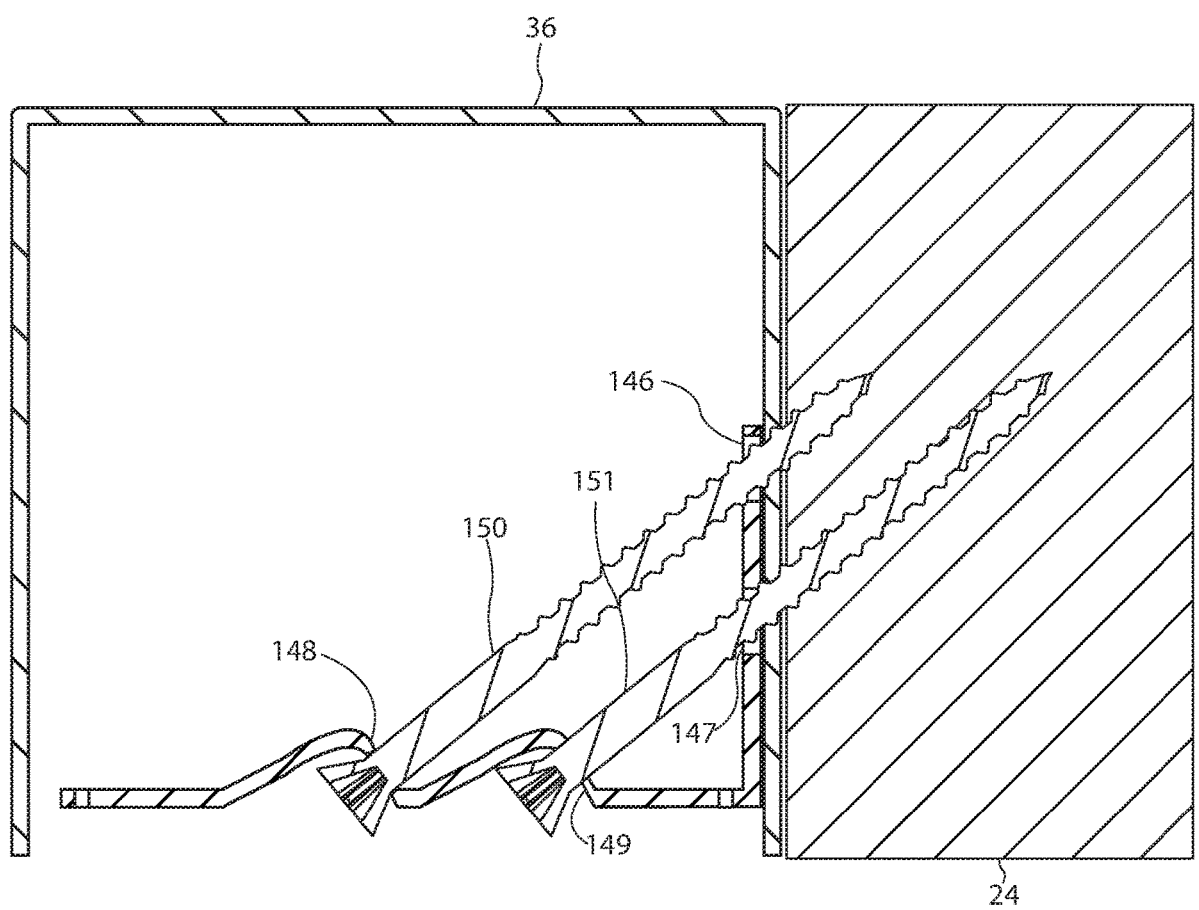
FIG. 8C a cross-sectional view taken along the line-8-8 of FIG. 8A.

FIGS. 8A to 8C show an alternative embodiment of an L-bracket 11.

The alternative L-bracket 11 includes a long arm 140, a short arm 142 and gussets 144 (i.e. at least one gusset). The at least one gusset 144 stiffens the alternative L-bracket 11 and provides increased mounting strength. Formed on the long arm 140 are first and second countersunk holes 148 and 149, (i.e. at least one countersunk hole). Formed on the short arm 142 are first and second clearance holes 146 and 147, (i.e. at least one clearance hole), which function in conjunction with the first and second countersunk holes 148 and 149 to attach the alternative L-bracket 11 to a ceiling joist 24. The long arm 140 also includes threaded fixture bracket mounting holes 156. The corners of the long arm 140 and short arm 142 may, optionally, be radiused to reduce sharp edges. The alternative L-bracket 11 may also, optionally, include a hole for a ground screw.

In the exemplary embodiment, the alternative L-bracket 11 is made from a single piece of 12 gauge sheet metal cut and formed to shape. The first and second countersunk holes 148 and 149 formed in the long arm 140 allow the heads of first and second wood screws 150 and 151 to be flush with the surface of the bracket. Exemplary dimensions for the alternative L-bracket 11 are as follows: The long arm 140 is approximately 4 inches long by 1.2 inches wide. The short arm 142 is approximately 2.2 inches tall by 1.4 inches wide. The gussets 144 are approximately 3 inches in length at their junction with the long arm 140 and are approximately 1 inch in height. The first and second countersunk holes 148 and 149 are approximately ¼ inch in diameter and the first and second clearance holes 146 and 147 are approximately 7/16 inch in diameter. The fixture bracket mounting holes 156 are 10-32 threaded holes. The above dimensions are provided for reference only. The utility of the alternative L-bracket 11 is not dependent on any particular dimensions or on any particular type of material. The bracket's dimensions and materials can vary from those provided above, while still allowing the bracket to serve its intended purpose.

Installation of the L-Bracket Alternative Embodiment

Installation of the alternative L-bracket 11 is generally similar to that of the L-bracket 10 and reference will be made to FIGS. 4B to 4I and 8C. In step 1, a preexisting ceiling fan or lighting fixture is removed from the ceiling. In step 2, wiring in the electrical junction box 36 is moved to one side, as may be necessary, to make room for the alternative L-bracket 11. (See FIG. 4B.) In step 3, the alternative L-bracket 11 is placed within the electrical junction box 36. (See FIG. 4C.) The short arm 142 is positioned against a wall of the junction box on a side adjacent a joist 24. In this position, a free end of the long arm 140 may extend over the ceiling drywall 34. If such is the case, an installer marks a scribe line 42 around the free end of the long arm 140.

In step 4, an installer notches or cuts out the ceiling drywall 34 interior of the scribe line 42 to form a cutout 44 in the ceiling drywall 34. (See FIGS. 4D and 4E.) The cutout 44 allows the alternative L-bracket 11 to be mounted flush with the ceiling drywall 34.

With reference to FIG. 8C, in step 5, the installer attaches the alternative L-bracket 11 to the ceiling joist 24 by inserting the first wood screw 150 through the first countersunk hole 148 and through the first clearance hole 146. Thereafter, the first wood screw 150 is driven through the electrical junction box 36 and into the wood ceiling joist 24. Next, the installer inserts the second wood screw 151 through the second countersunk hole 149 and through the second clearance hole 147. As with the first wood screw 150, the second wood screw 151 is driven through the electrical junction box 36 and into the wood ceiling joist 24. Upon both the first and second wood screws 150 and 151 being driven into the ceiling joist 24, the alternative L-bracket 11 is securely fastened to the ceiling joist 24.

Experimentation has demonstrated that wood screws can be driven though plastic junction boxes without the need for pilot holes. Pilot holes may be necessary in the case of a sheet metal junction box. Due to the geometry of the alternative L-bracket 11, the second wood screw 151 may be shorter than the first wood screw 150.

In step 6, a ceiling fan or lighting fixture mounting bracket 48 (shown in schematic form) is installed on the alternative L-bracket 11 with threaded screws. FIG. 4I is illustrative. (FIG. 4I specifically references the L-bracket 10, however, the alternative L-Bracket 11 attaches to the fixture bracket 48 in the same manner, i.e. via screws.

The T-Bracket

With reference to FIGS. 2A-2C and 5A, the T-bracket 20 of the present invention comprises an angle element 50 and a fixture element 52. The angle element 50 serves to mount the T-bracket 20 to a joist 24 and the fixture element 52 serves to attach the mounting bracket 46 of a ceiling fan or lighting fixture to the T-bracket 20. The angle element 50 has a first leg 53 and a second leg 55. The second leg 55 is removably attachable to the fixture element 52 via threaded holes 65 and screws 64.

Similar to the L-bracket 10, the first leg 53 of the angle element 50 of the T-bracket 20 includes two countersunk mounting holes 54. Unlike conventional countersunk holes, the countersinks 57 are positioned on a side of the first leg 53 which abuts the junction box, i.e. on a side opposite the side the wood screws 26 first pass through the holes 54 in the first leg. (See FIG. 5A.) This unusual placement of the countersinks 57 allows the wood screws 26 to be installed at an angle.

The fixture element 52 of the T-bracket 20 has a first end 60 and a second end 62, where the first and second ends 60 and 62, each include (optional) radiused corners 58. The fixture element 52 includes two threaded fixture bracket mounting holes 56 and a threaded ground screw hole 63. The fixture element holes 56 are spaced to be compatible with the hole spacing of common heavy duty electrical junction boxes, which correspond to the mounting hole spacing on most mounting brackets included with heavy ceiling fans or lighting fixtures.

Like the L-bracket 10, the T-bracket 20 is suitable for mounting heavy ceiling fans and heavy lighting fixtures to a joist, regardless of whether the joist is accessible from above the ceiling. The T-bracket 20 places the centerline of the load of such retrofit fixtures closer to the joist 24 and therefore, generally, has a higher load capacity than the L-bracket 10.

In an exemplary embodiment, the T-bracket 20 is fabricated from 3/16" steel flat stock. The fixture element 52 is approximately 3.75" long by 1" wide. With respect to the angle element 50, the first leg 53 is approximately 2" long by 1" wide and the second leg 55 is approximately 1.25" long by 1" wide. The mounting holes 54 in the angle element 50 are 1/4" diameter through-holes with a 3/8" countersink. The fixture element mounting holes 56 are 10-32 threaded holes. The radiused corners 58 of the fixture element 52 have a 0.187" radius. The angle element 50 and the fixture element 52 are removably attachable by means of threaded screws and threaded holes. Testing of the above-referenced exemplary embodiment has shown that it can support a fixture weight of at least 180 lbs.

The above dimensions for the T-bracket are provided for reference only. The utility of the T-bracket is not dependent on any particular dimensions or on any particular type of material. The bracket's dimensions and materials can vary from those provided above, while still allowing the bracket to serve its intended purpose. The weight the bracket can support will vary with material type and specific choice of dimensions.

Installation of the T-Bracket

With reference to FIGS. 5A to 5I, installation of the T-bracket 20 in an exemplary ceiling fan or lighting fixture retrofit installation in a representative ceiling will be described in more detail. Depicted in the figures are, among other items, a representative drywall ceiling 34, a representative electrical junction box 36, representative junction box wiring 38, and representative framing joists 24.

In step 1, the preexisting ceiling fan or lighting fixture 32 (not shown) is removed from the ceiling. With reference to FIG. 4B, in step 2, upon removal of the preexisting fixture 32, the wiring 38 in the electrical junction box 36 is moved to one side, if necessary, to make room for the T-bracket 20.

Figure 5A:
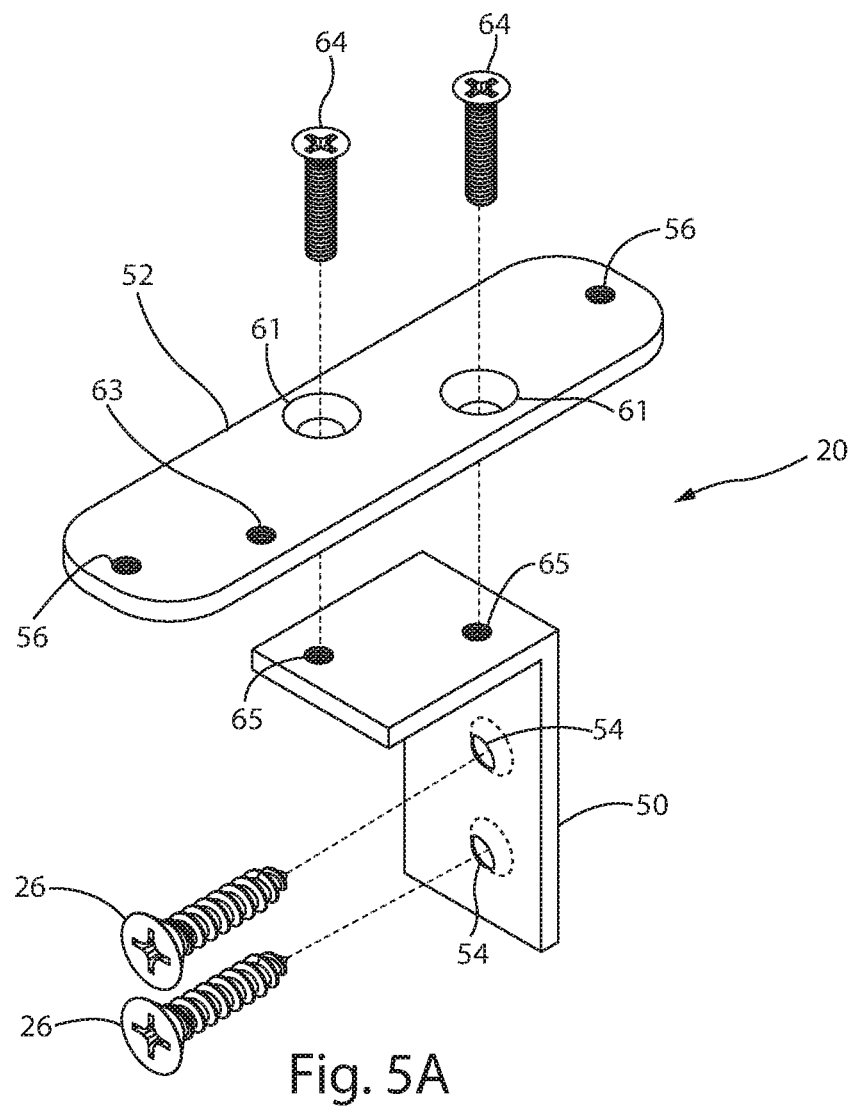
FIG. 5A is an exploded front perspective view of the T-bracket of FIG. 2A showing the wood screws used to attach the T-bracket to a joist.
Figure 5B:
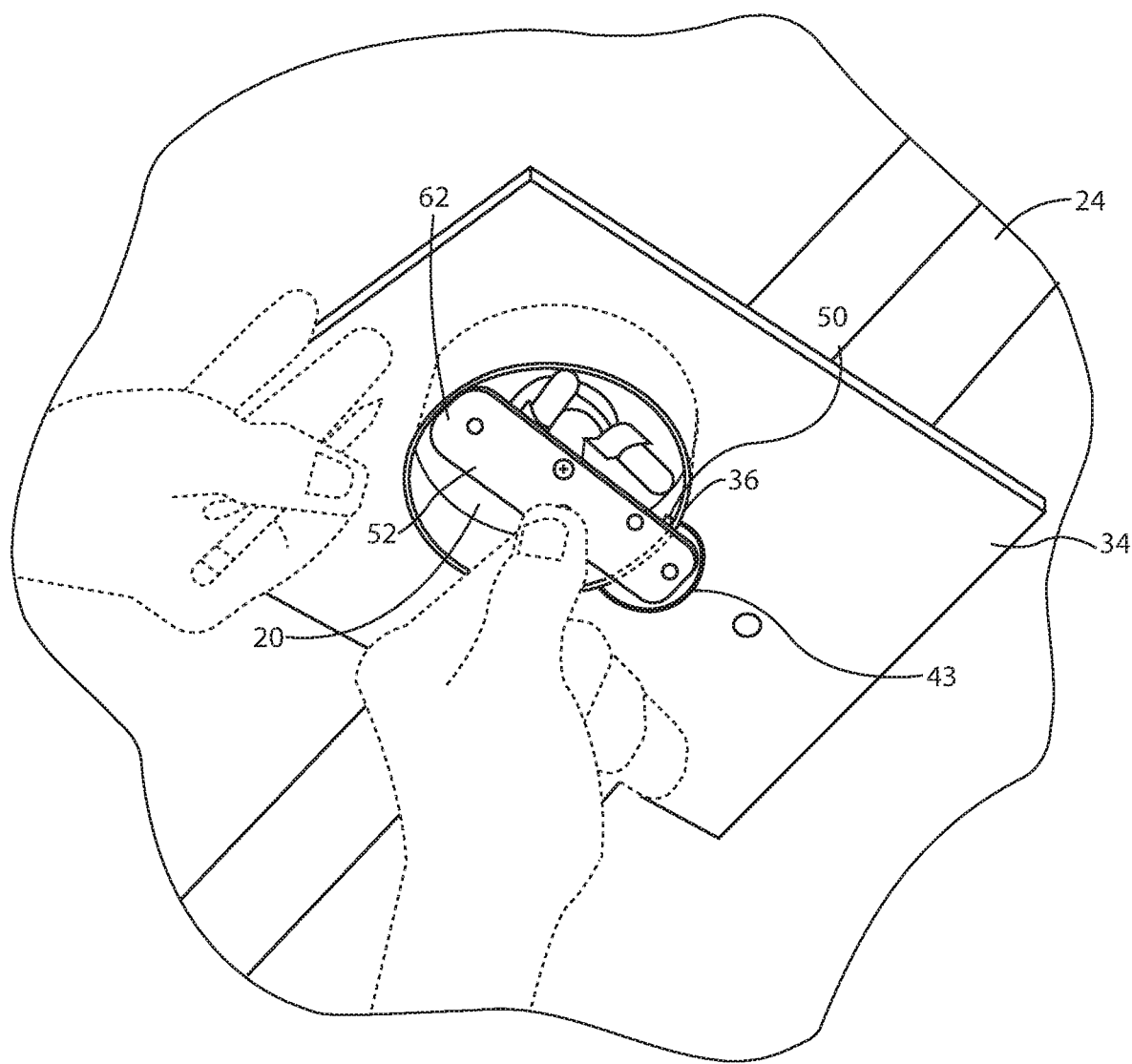
FIG. 5B is a perspective view of the T-bracket of FIG. 2A held within a junction box showing an installer scribing a line about a portion of the T-bracket.

With reference to FIG. 5B, in step 3, the T-bracket 20 is placed within the junction box 36. The angle element 50 of the T-bracket 20 is positioned against a wall of the junction box on the side adjacent the joist 24. In this position, a first end 62 of the fixture element 52 extends over the ceiling drywall 34. An installer marks a scribe line 43 around the first end 62 of the fixture element 52.

Figure 5C:
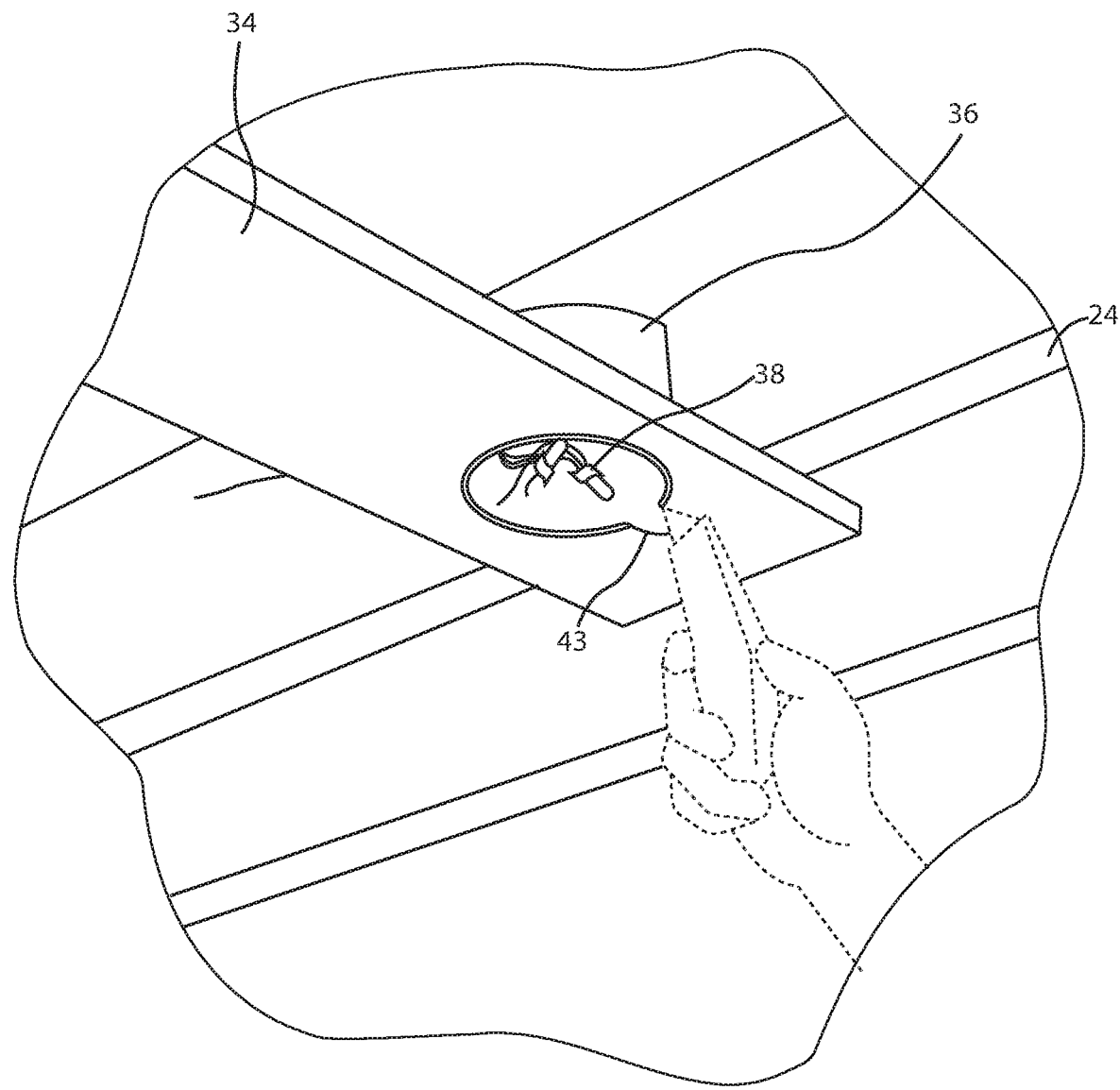
FIG. 5C is a perspective view showing an installer cutting out a portion of ceiling drywall interior of the scribe line depicted in FIG. 5B.

With reference to FIG. 5C, in step 4, an installer notches or cuts out the ceiling drywall 34 interior of the scribe line 43 to form a cutout 66 (see FIG. 5E) in the ceiling drywall 34. The cutout 66 allows the T-bracket 20 to be mounted flush with the ceiling drywall 34.

Figure 5D:
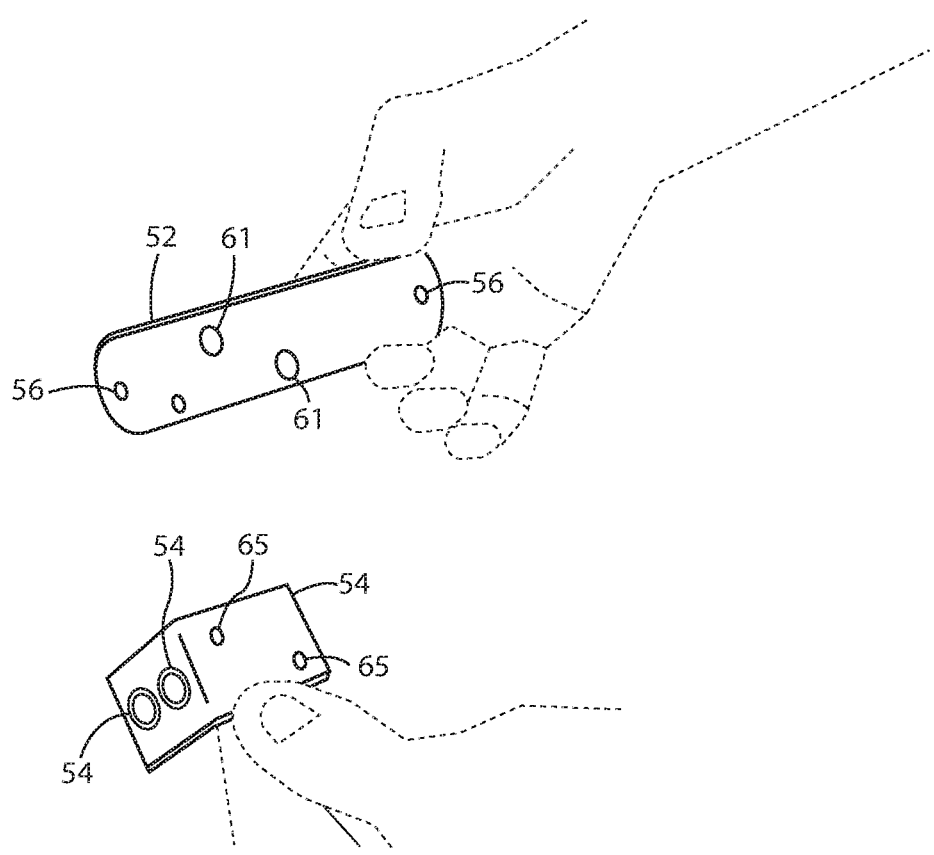
FIG. 5D is a perspective view of an installer holding a T-bracket of the present invention disassembled into its angle element and fixture element components.

With reference to FIG. 5D, in step 5, the installer removes the T-bracket from the junction box and disassembles the bracket into its two component parts, the angle element 50 and fixture element 52.

Figure 5E:
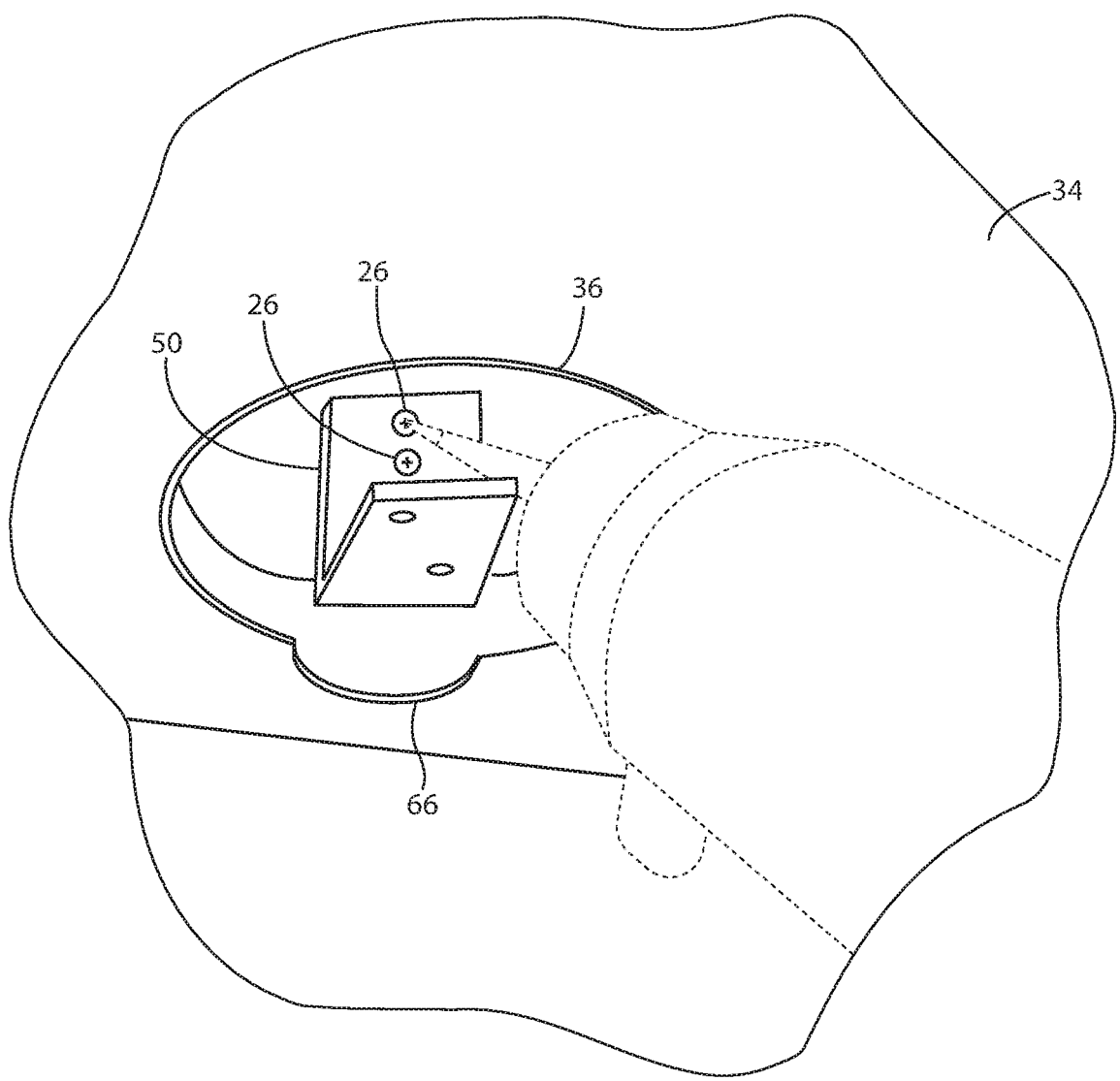
FIG. 5E is a perspective showing an installer attaching the angle element of FIG. 5D to a joist in a ceiling by driving the screws through a pre-existing electrical junction box.
Figure 5F:
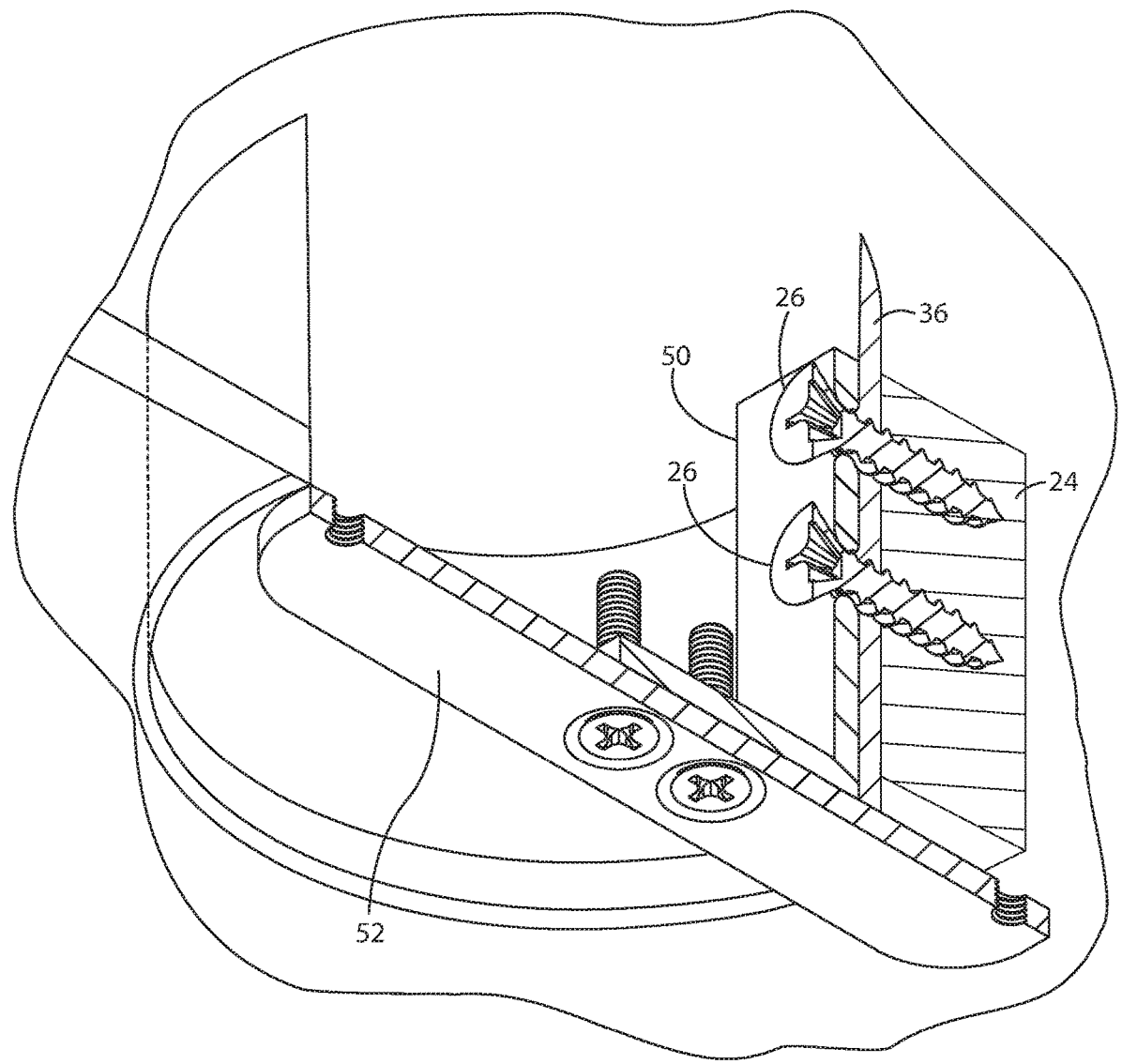
FIG. 5F is cross-sectional view showing the angle element of the T-bracket attached to a joist through the wall of an electrical junction box.

With reference to FIGS. 5E-5F, in step 6, the installer attaches the angle element 50 of the T-bracket 20 to the ceiling joist 24 by driving wood screws 26 through the countersunk mounting holes 54, through the wall of the junction box 36, and into the joist 24. This attachment is shown in detail in FIG. 5F. Generally, the installer will drive the wood screws through the side wall of the junction box 36 and into the adjacent joist 24 without first drilling pilot holes. This is typically the case when the preexisting junction box is made of plastic. If the preexisting junction box is made of sheet metal, pilot holes may be necessary.

Figure 5G:
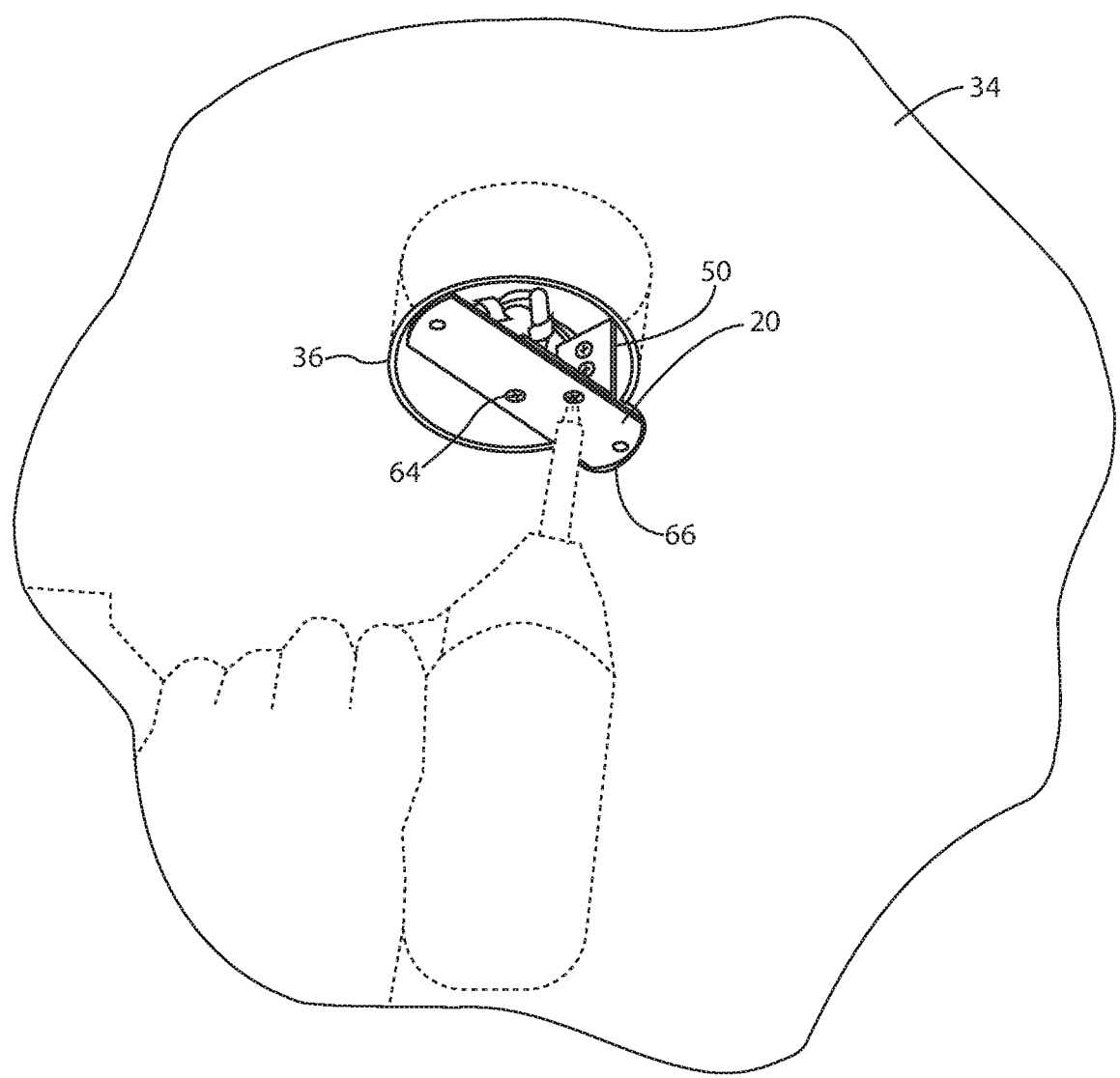
FIG. 5G is a perspective view showing the fixture element of the T-bracket being attached to the angle element of the bracket, by an installer.
Figure 5H:
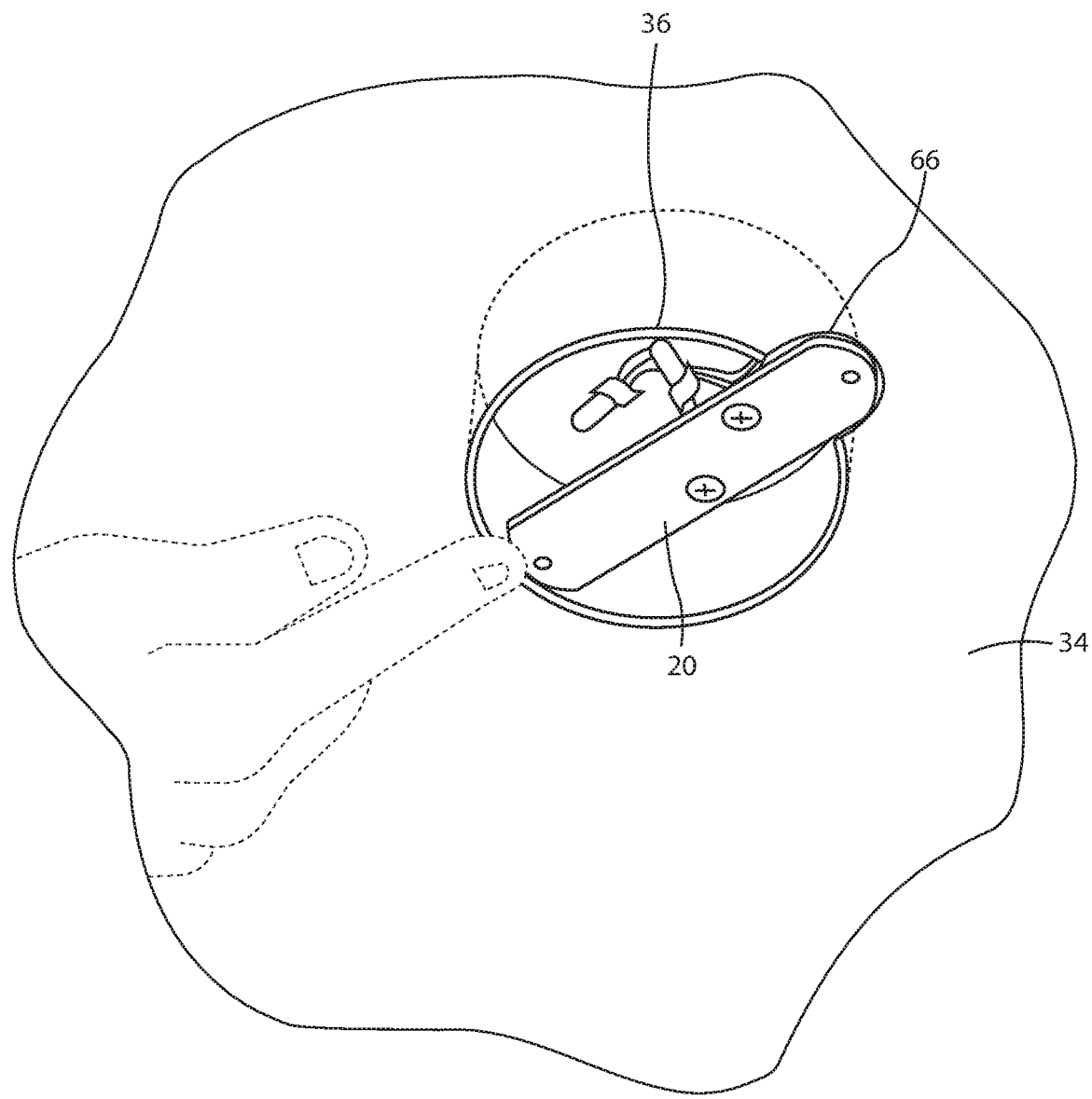
FIG. 5H is a perspective view showing the T-bracket of FIG. 2A installed in a ceiling.
Figure 5I:
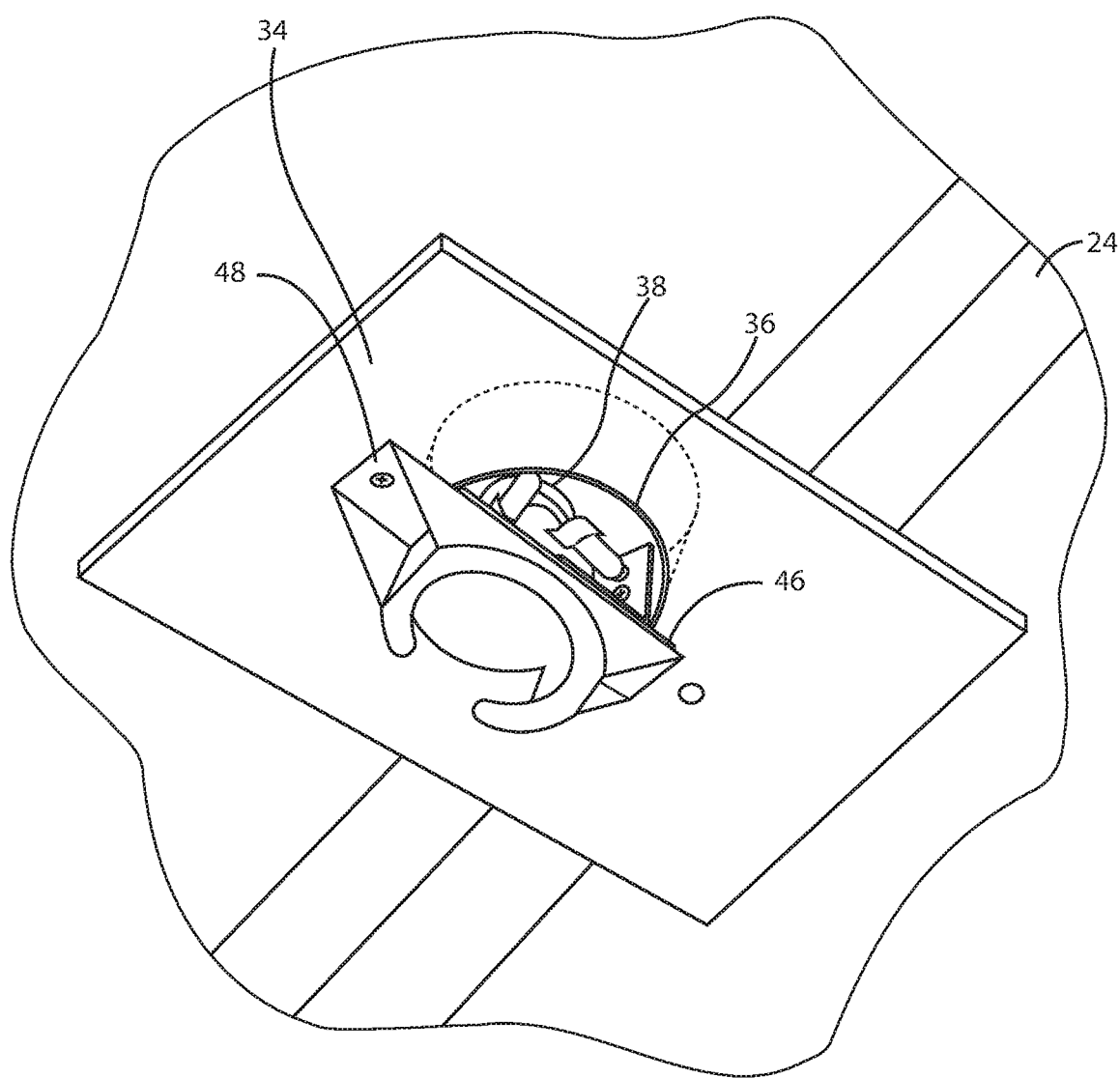
FIG. 5I is a perspective view showing a representative mounting bracket for a retrofit fan or lighting fixture attached to the T-bracket of FIG. 2A, installed in a ceiling.

With reference to FIG. 5G, in step 7, the fixture element 52 is attached to the angle element 50 by means of screws 64 which pass through holes 61 in the fixture element 52 and engage threaded holes 65 in the angle element 50. With reference to FIGS. 5H and 5I, a ceiling fan or lighting fixture mounting bracket 46 (shown schematically) is installed on the T-bracket 20 with threaded screws. The spacing of the fixture mounting holes 56 corresponds to that of the mounting brackets for most commercially available heavy ceiling fans and lighting fixtures. The T-bracket 20 is also equipped with a threaded hole 62 for a ground wire (see FIGS. 2A and 2B), which may be required in some installations.

The Joist Hanger Assembly

With reference to FIGS. 3A through 3E, the joist hanger assembly 30 comprises a cross brace 68, a hanger rod 72, a fixture interface bracket 74 and assembly hardware, i.e. nuts 90 and washers 92. The cross brace 68 is fabricated from angle stock and includes a plurality of holes 70, which may be uniformly spaced along a length of the cross brace 68. The hanger rod 72 is fabricated from threaded rod of a preselected threading. The holes 70 of the cross brace 68 are sized so as to be clearance holes for the hanger rod 72. The fixture interface bracket 74 is fabricated from sheet or bar stock and includes a raised center portion 84, downwardly angled portions 86 and horizontal mounting portions 88. The fixture interface bracket further includes a center hole 76 sized as a clearance hole for the hanger rod 72, heavy ceiling fan or lighting fixture bracket attachment holes 78, where the fixture bracket attachment holes 78 are spaced to match the attachment holes found in both 3" and 4" heavy duty electrical junction boxes. This hole spacing also corresponds to the mounting bracket spacing for most heavy ceiling fans and lighting fixtures.

In an exemplary embodiment, the cross brace 68 is fabricated from 1 1/4" by 1 1/4" steel angle with 3/8" diameter holes spaced 1" apart. The hanger rod 72 is fabricated from 3/8" threaded steel rod and the fixture interface bracket is fabricated from 3/32" steel bar stock. A joist hanger assembly fabricated using the above referenced materials and with a joist spacing of about 18" has been found to support a weight of at least 180 pounds or well in excess of the weight of most common ceiling fans or lighting fixtures. The dimensions and materials used in the exemplary embodiment of the joist hanger assembly 30 of the present invention presented here are not meant to be limiting. Alternative materials and dimensions are also suitable. Alternative materials would include aluminum and structural plastics.

Installation of the Joist Hanger Assembly

The joist hanger assembly 30 may be used where there is sufficient space above the joists to place the cross brace 68. Referring to FIGS. 6A to 6H, installation of the joist hanger assembly 30 in an exemplary ceiling fan or lighting fixture retrofit installation in a representative ceiling will be described in more detail. Depicted in the figures are, among other items, a representative drywall ceiling 34, a representative electrical junction box 36, representative junction box wiring 38, and representative framing joists 24.

Figure 6A:
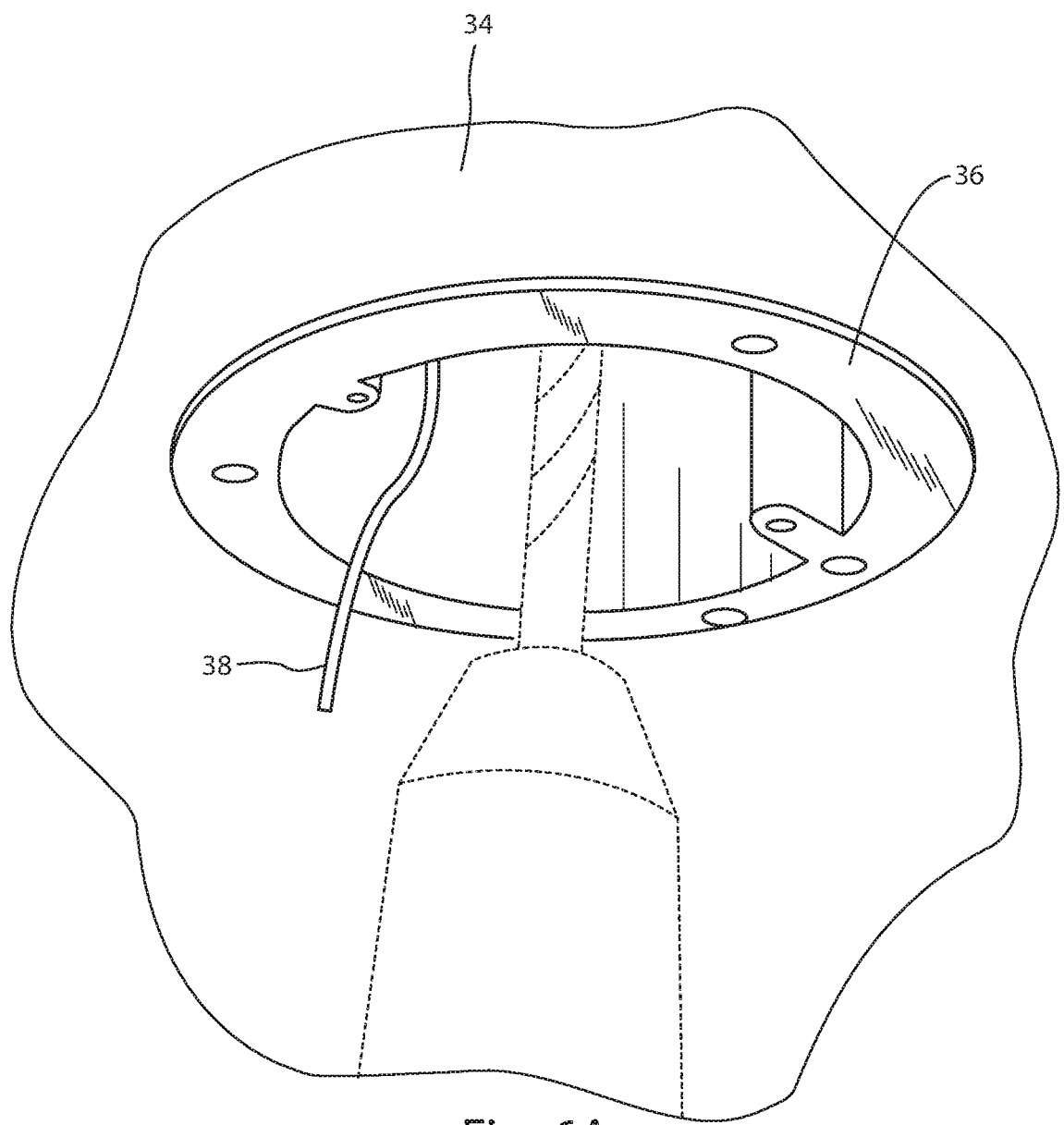
FIG. 6A is a schematic view of an installer drilling a clearance hole in a ceiling mounted electrical junction box.
Figure 6B:
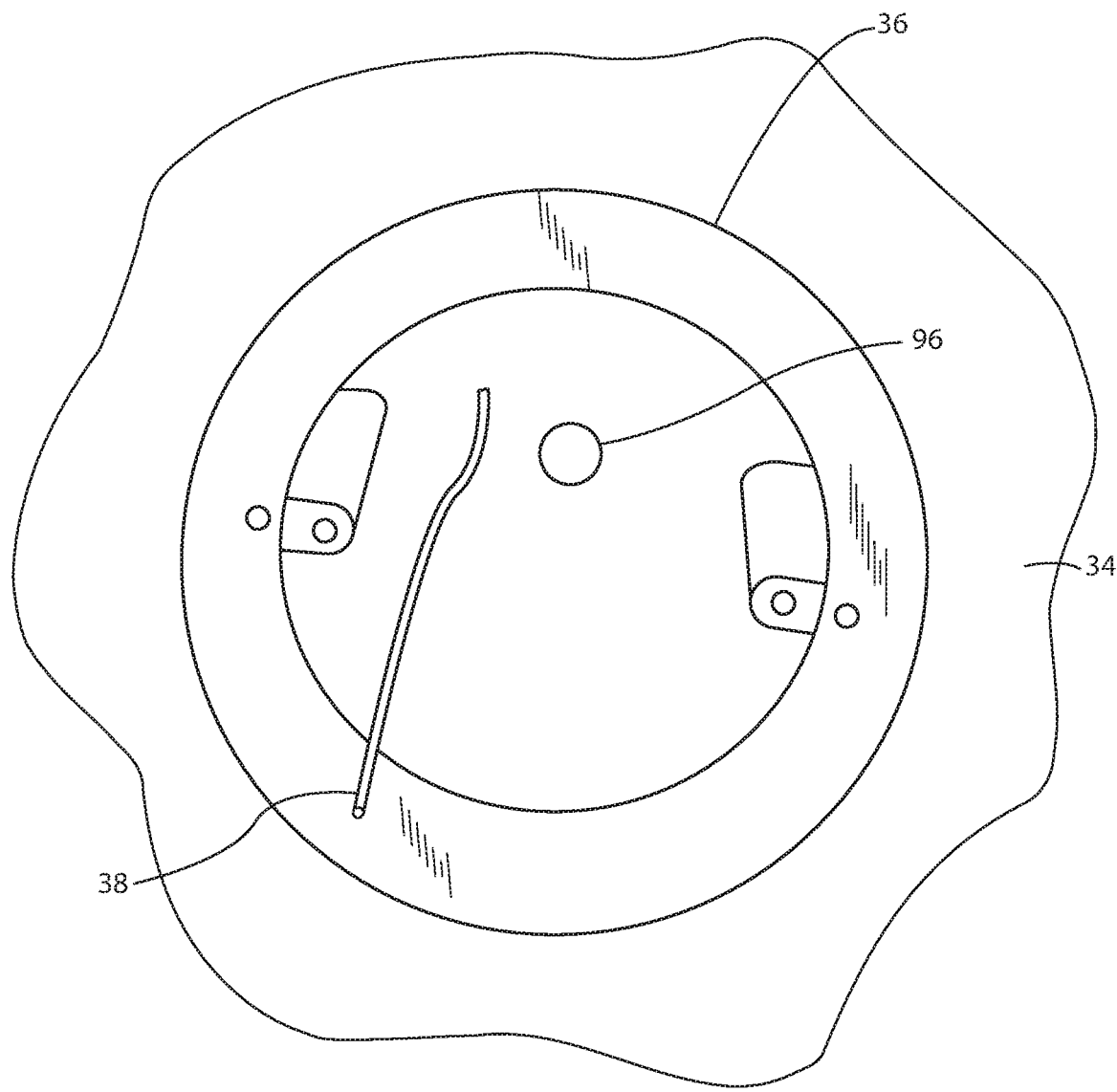
FIG. 6B is a perspective view of preexisting junction box, installed in a ceiling, with a clearance hole drilled in the box.

In step 1, the preexisting ceiling fan or lighting fixture (not shown) is removed from the ceiling. With reference to FIGS. 6A and 6B, in step 2, electrical wiring is moved out of the way so that an installer may drill a clearance hole 96 in the center of an electrical junction box. In step 3, the installer drills a center hole or clearance hole 96. FIG. 6A references the installer drilling the clearance hole 96 and FIG. 6B shows the clearance hole 96 drilled in the junction box 36.

Figure 6C:
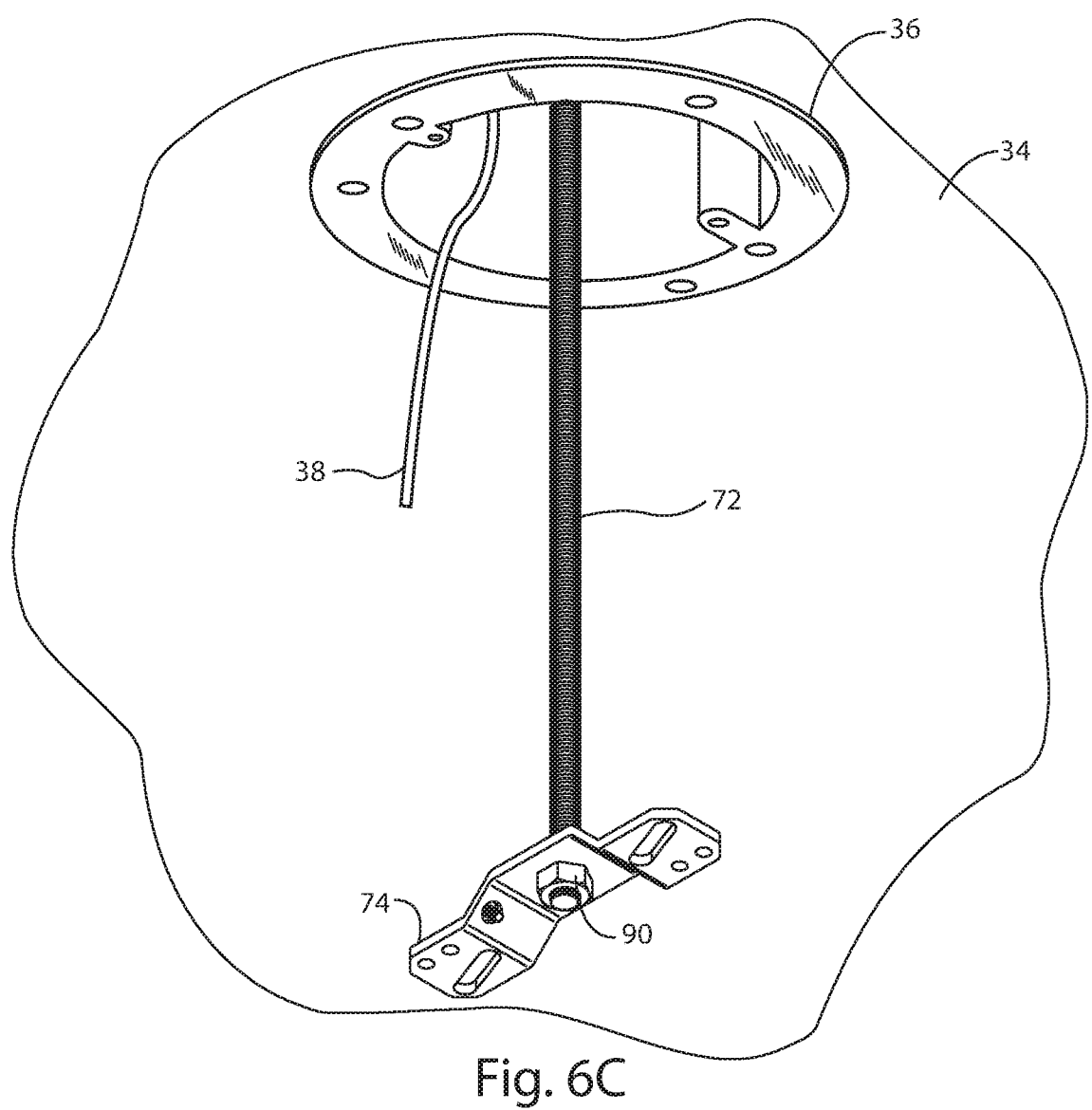
FIG. 6C is a perspective view of a hanger rod and an attached fixture interface bracket in accordance with the present invention being inserted through the clearance hole in a junction box, depicted in FIG. 6B.
Figure 6D:
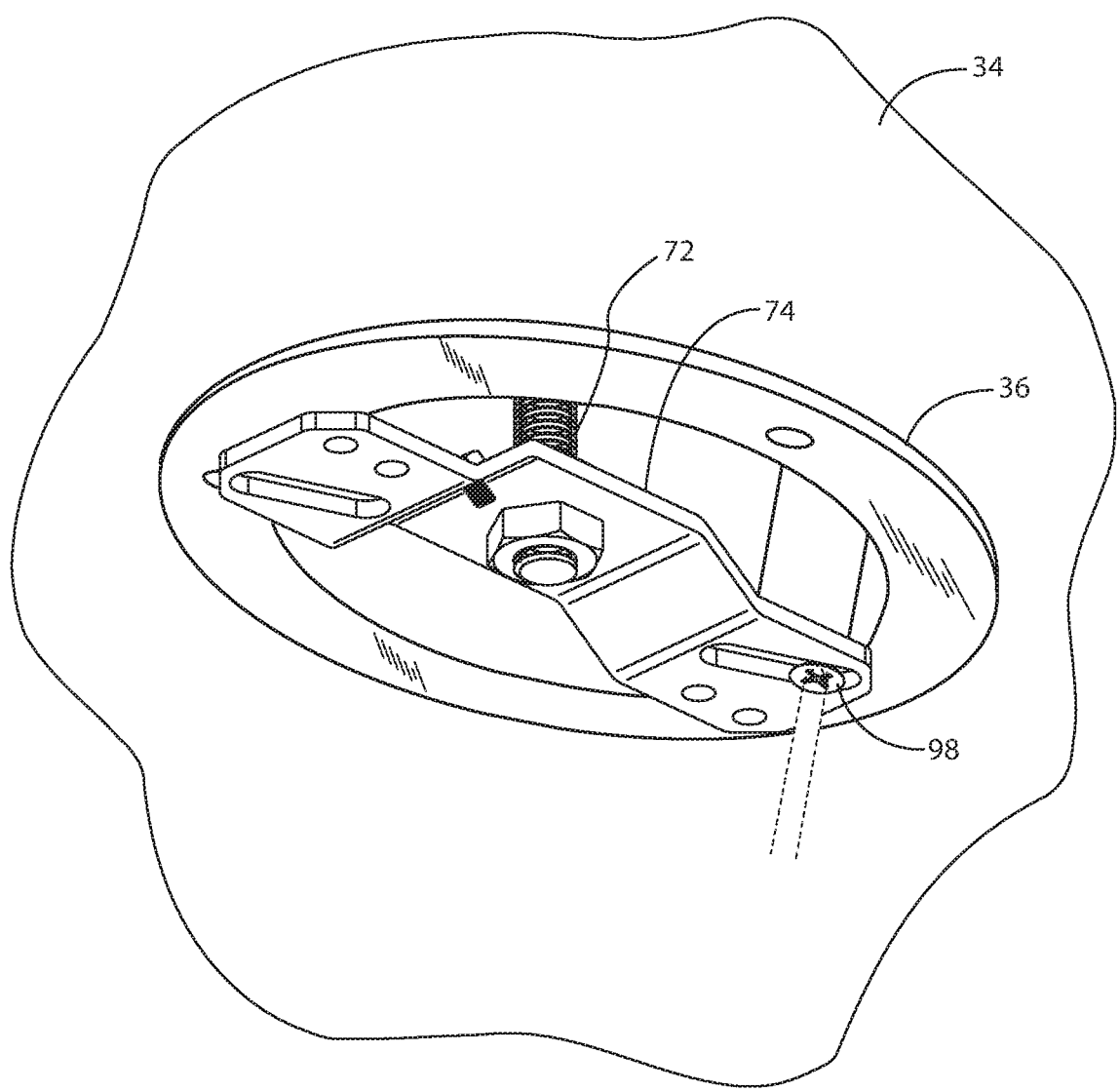
FIG. 6D is a perspective view of an installer attaching the hanger rod and attached fixture interface bracket of FIG. 6C to a junction box with a temporary screw.

With reference to FIG. 6C, in step 4, an installer assembles the fixture interface bracket 74 to the hanger rod 72 with two nuts 90, as depicted in FIG. 6C. With reference to FIGS. 6C and 6D, in step 5, the installer inserts the hanger rod 72, with the fixture interface bracket 74 attached, into the clearance hole 96 in the electrical junction box 36 and secures the hanger rod and attached fixture interface bracket with a temporary screw 98. The temporary screw 98 passes through a hole 82 in the fixture interface bracket (see FIG. 6D) and into the side wall of the junction box 36. The temporary screw 98 is referred to as a "temporary screw" as it serves to secure the hanger rod 72 and fixture interface bracket 74 to the junction box 36 only for so long as is needed to complete the installation of the joist hanger assembly 30. The temporary screw 98 is removed prior to the installation of a retrofit ceiling fan or lighting fixture.

Figure 6E:
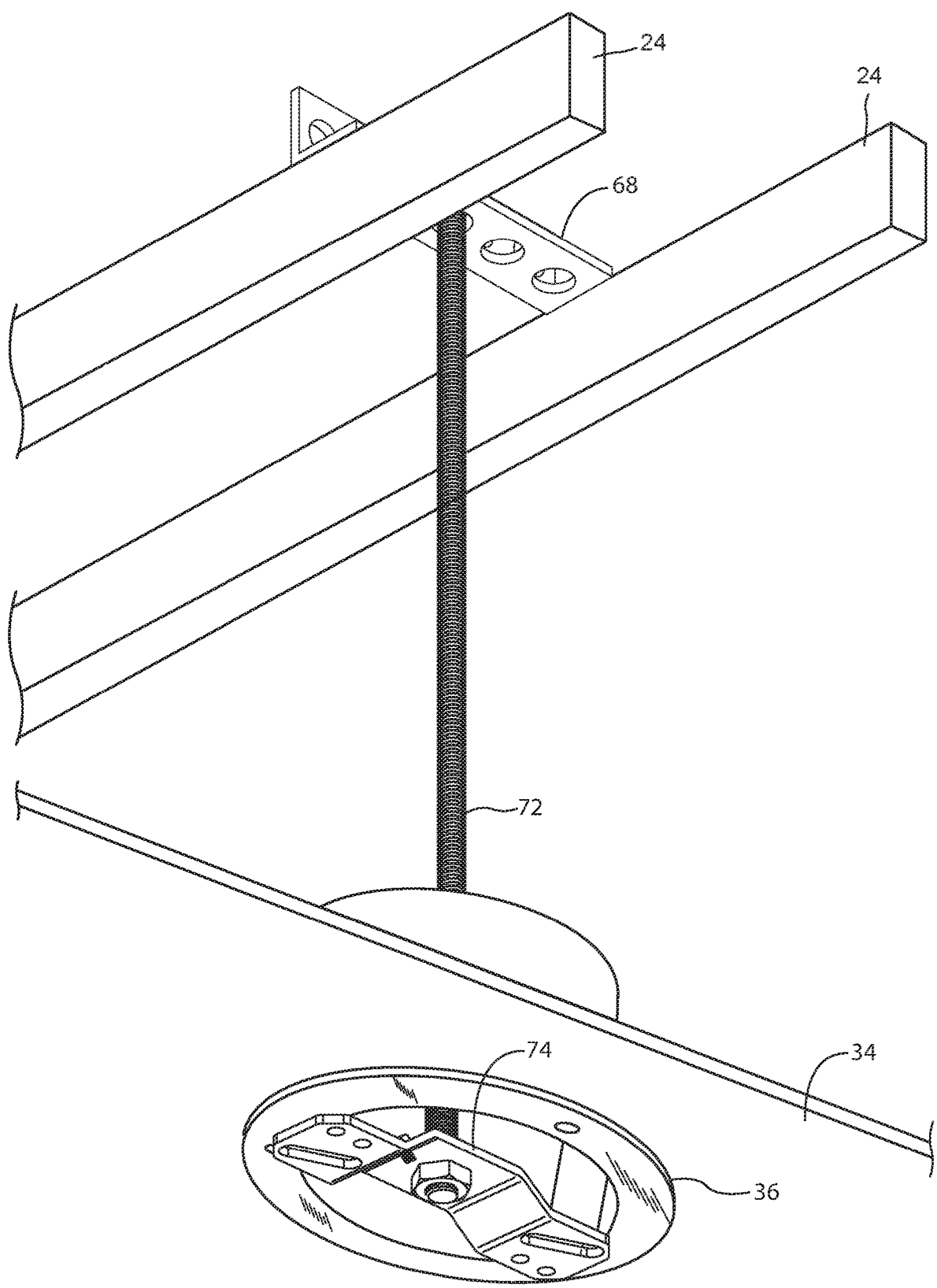
FIG. 6E is a perspective view of the hanger rod and fixture interface bracket of FIG. 6C attached to a cross brace in accordance with the present invention, where the cross brace spans ceiling framing structure.
Figure 6F:
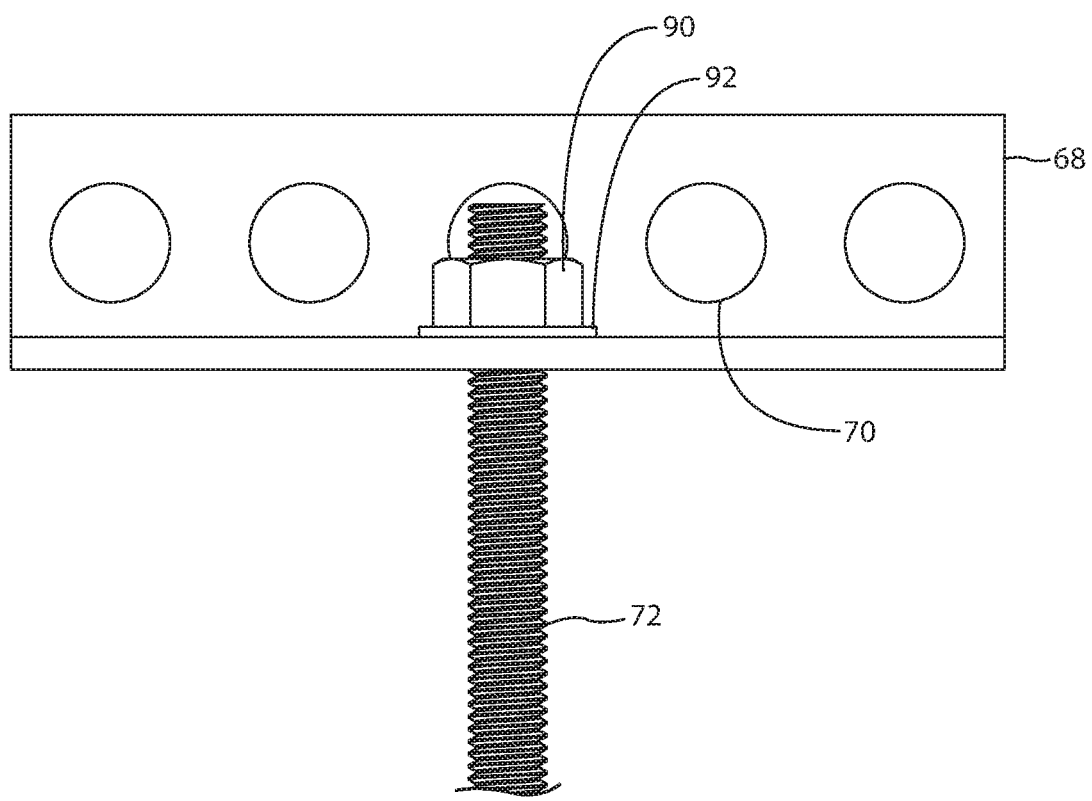
FIG. 6F is an enlarged view of showing the hanger rod attachment to the cross brace of FIG. 6E.

With reference to FIGS. 6E and 6F, in step 6, the cross brace 68 is positioned across adjacent joists 24 such that a free end of the hanger rod 72 protrudes from one of the plurality of holes 70 in the cross brace 68. In step 7, the hanger rod 72 is secured to the cross brace 68 by means of a nut 90, with a washer 92 disposed between the nut 90 and the cross brace 68. During this step, the nut 90 is tightened such that the fixture interface bracket 74 is held "snug" against the electrical junction box 36.

Figure 6G:
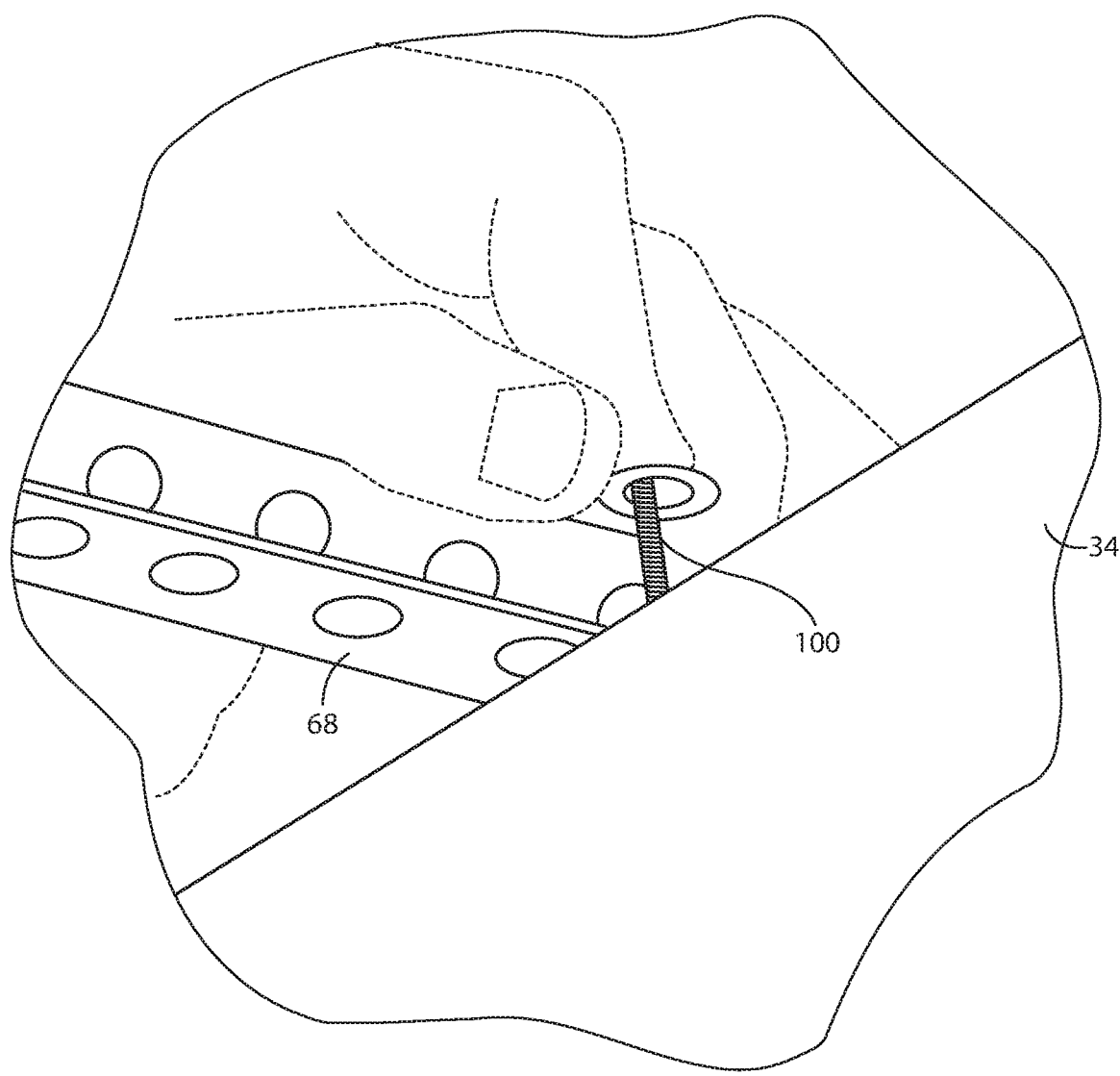
FIG. 6G is a schematic view of an installer securing an end of the cross brace of FIG. 6E to ceiling framing structure.
Figure 6H:
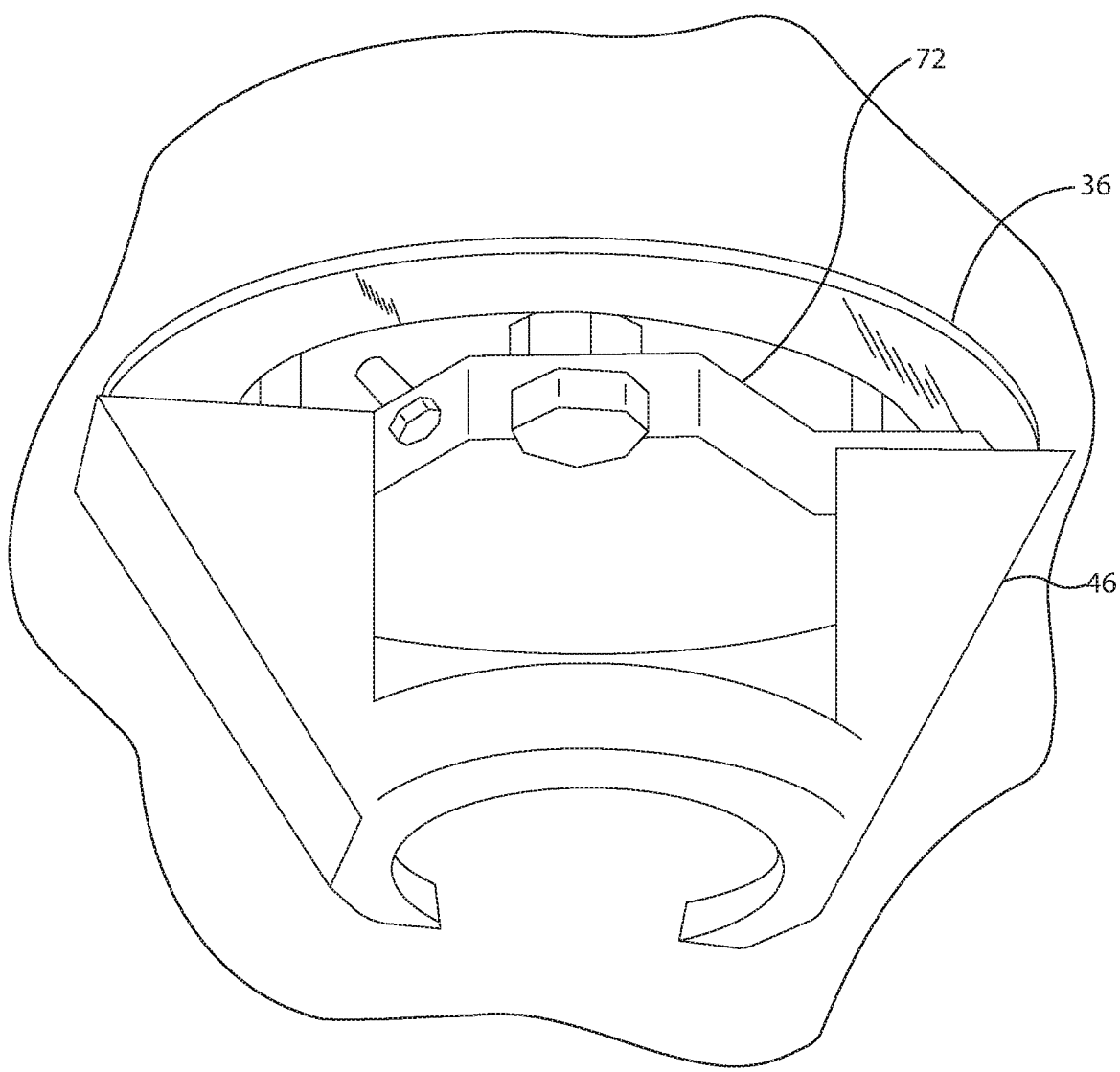
FIG. 6H is a schematic view showing a representative fixture mounting bracket of a retrofit fixture attached to the fixture interface bracket of the present invention.

With reference to FIG. 6G, in step 8, the cross brace 68 is secured to the joists 24 with a fastener 100. With reference to FIG. 6H, the temporary screw 98 is removed and a mounting bracket 46 of a retrofit ceiling fan or lighting fixture may be installed via threaded screws.

The Cross-Bracket Assembly

With reference to FIGS. 7A to 7F, the cross-bracket assembly 102 comprises a joist attachment bracket 104 and a cross bracket 112, wherein the cross-bracket 110 is rotateably attachable to the joist attachment bracket 104. The joist attachment bracket 104 is flat bracket having a length sized to span the distance between ceiling joists and a width and thickness sized to support a relatively heavy ceiling fixture. Typically, the joist attachment bracket will be made of steel flat stock and will have a length of about 18 inches, a width of about 1 inch and a thickness of about ³⁄₁₆ inch. The length corresponds to ceiling joist spacing which is about 18 inches in modern residential construction in the United States. Other lengths may prove desirable and necessary in any building where non-standard ceiling joist spacing was used. A joist attachment bracket of approximately 1 inch width and ³⁄₁₆ inch thickness provides sufficient strength to support most ceiling fixtures. The materials and dimensions specified above are exemplary only. Other dimensions and materials are suitable.

The joist attachment bracket 104 includes a plurality of threaded holes 106 which are spaced along a longitudinal centerline of the bracket, and includes slots 108 at each end of the bracket. The slots 108 allow the joist attachment bracket 104 to be attached to joists 24 via a fastener 116, which will typically be a wood screw. The slots 108 allow the fastener 116 to be installed at the approximate center of a joist 24.

The cross-bracket 110 is also a flat bracket having a length sized to span the diameter of an electrical junction box 36. In the exemplary embodiment, the cross bracket is fabricated from steel and has a width of ¾" and a thickness of ¹⁄₁₆". It should be noted however, that the cross bracket 110 does not carry substantial loads and can be fabricated with a variety of dimensions and from a variety of materials. The cross-bracket 110 includes a center hole 112 which allows it to be attached via a fastener 118 to one of the plurality of holes 106 in the joist attachment bracket 104. Typically, the fastener 118 will be a machine screw. Ends of the cross-bracket 110 include slots 114 which are used to attach the cross bracket 110 to existing holes in electrical junction box 36 via fasteners 120. The fasteners 120 will typically be machine screws. The slots 114 provide adjustability to accommodate a variety of ceiling fixture bolt patterns.

Figure 7A:
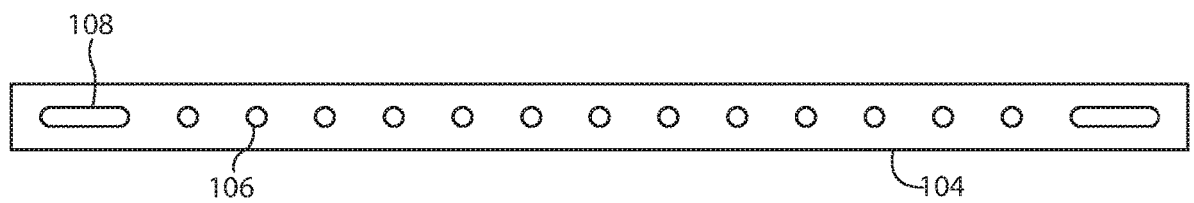
FIG. 7A is a top view of a joist attachment bracket for use with the cross-bracket assembly of the present invention.
Figure 7B:
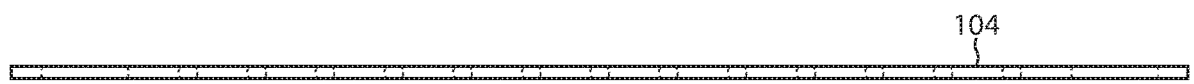
FIG. 7B is a side view of a joist attachment bracket for use with the cross-bracket assembly of the present invention.
Figure 7C:
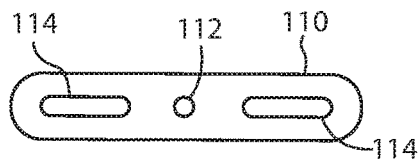
FIG. 7C is a top view of a cross-bracket for use with the cross-bracket assembly of the present invention.
Figure 7E:
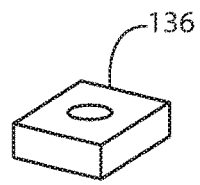
FIG. 7E is a perspective view of a spacer for use with the cross-bracket assembly of the present invention.
Figure 7D:
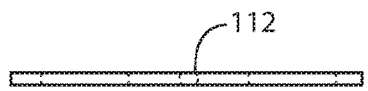
FIG. 7D is a side view of a cross-bracket for use with the cross-bracket assembly of the present invention.
Figure 7F:
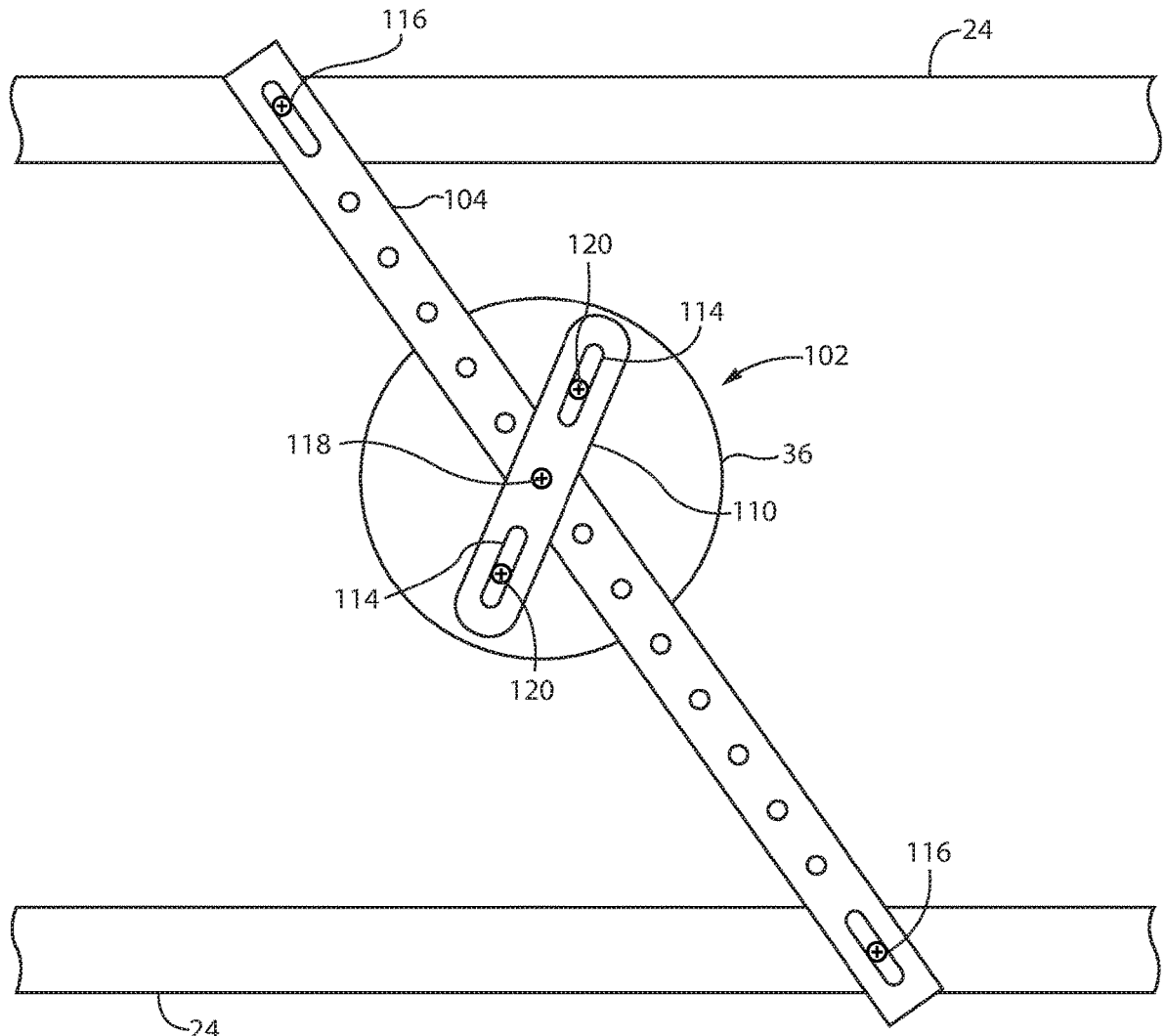
FIG. 7F is a perspective view of the cross-bracket assembly of the present invention.

Spacers 136 may be required during installation of the cross-bracket assembly 102. FIG. 7E depicts an exemplary embodiment of a suitable spacer.

Installation of the Cross-Bracket Assembly

Figure 7G:
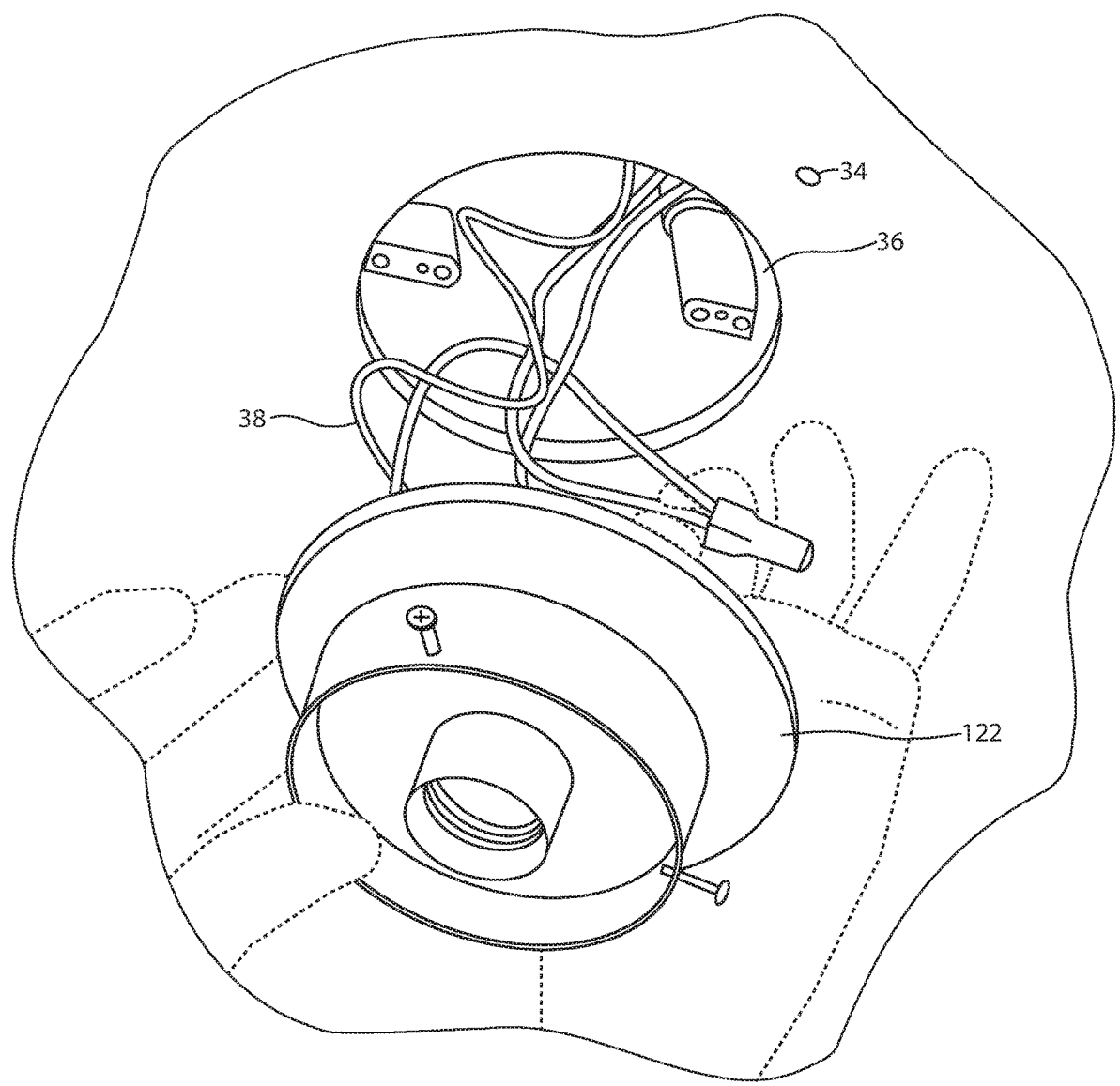
FIG. 7G is a perspective view of an installer removing a ceiling fixture to expose an electrical junction box in a ceiling.
Figure 7H:
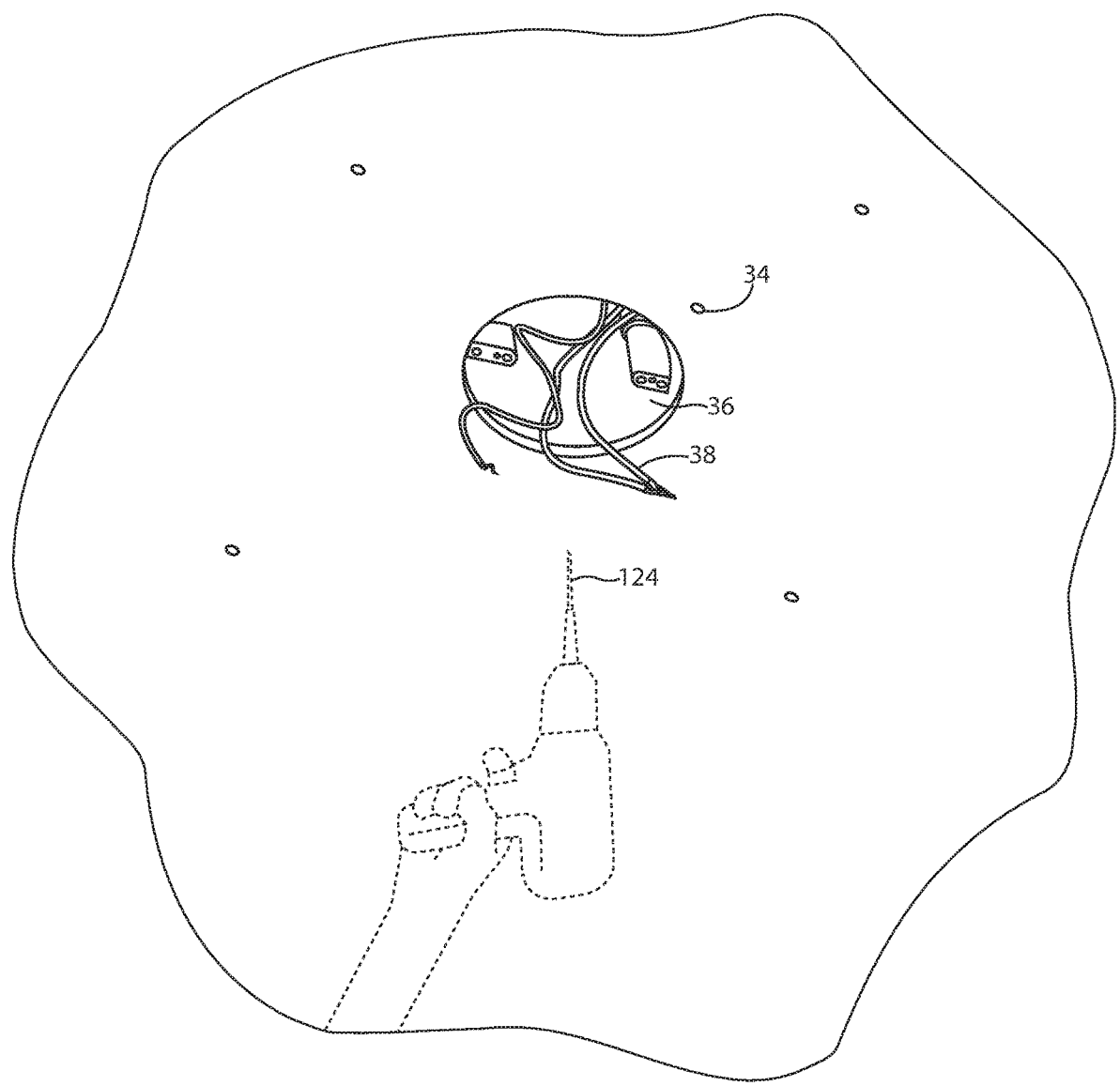
FIG. 7H is a perspective view of an installer locating ceiling joists in proximity to the junction of box of FIG. 7G.

The cross-bracket assembly 102 is attached to a ceiling, generally, as follows. With reference to FIG. 7G, in a first step, an installer first removes an existing ceiling fixture 122 which will expose a previously installed electrical junction box 36. With reference to FIG. 7H, in a second step, the installer next locates the ceiling joists 24 (not visible in this view) closest to the junction box 36 with a joist location device 124. The joist location device 124 may be an electronic device such as commercially available stud finders that use capacitance, radar or other technologies to locate studs, or, alternatively, the joists may be located with a screw driver or like tool, as is known to those of skill in the art.

Figure 7I:
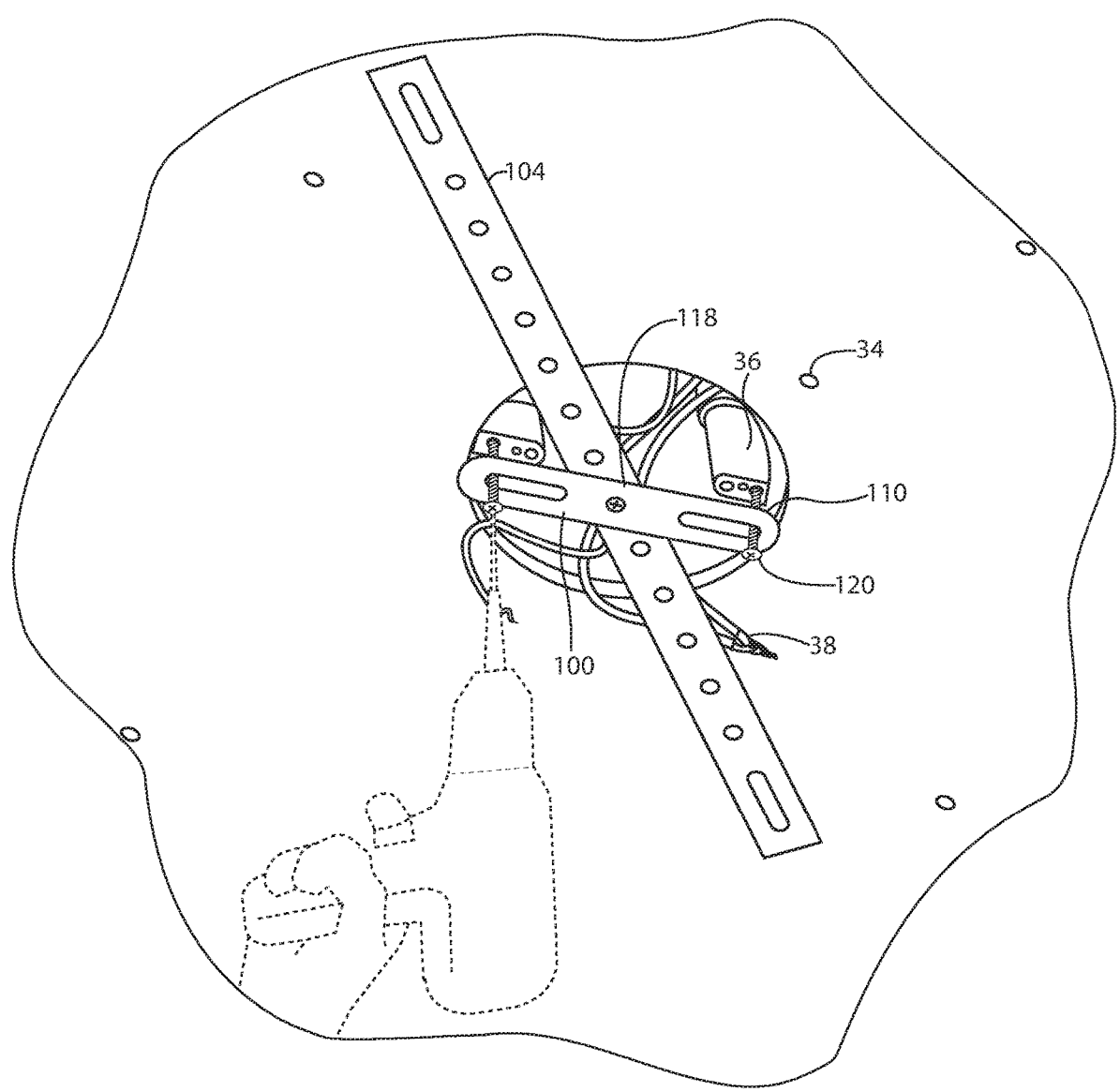
FIG. 7I is a perspective view of an installer attaching the cross-bracket and joist attachment bracket of the present invention to an electrical junction box of FIG. 7G.
Figure 7J:
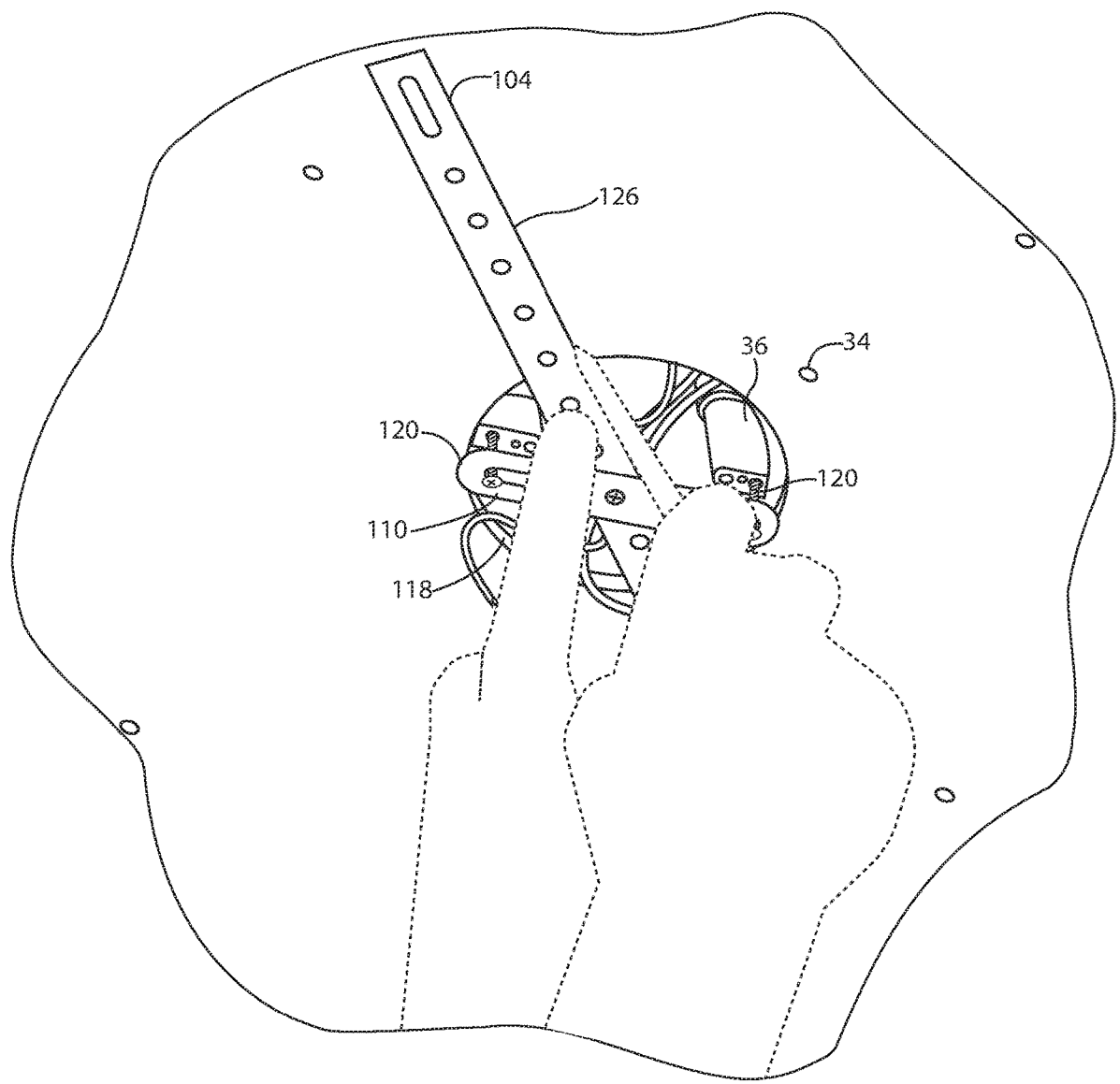
FIG. 7J is a perspective view of an installer marking a line around the joist attachment bracket of the present invention after it has been position across the joists located in FIG. 7H.

With reference to FIGS. 7I and 7J, in a third step, the cross-bracket 110 is assembled to the joist attachment bracket 104 via a fastener 118 and, in a fourth step, the installer attaches the cross bracket 110 to the junction box 36, via fasteners 120. If necessary, the installer may move the preexisting wiring 38 out of the way to provide clearance for the cross bracket 110. In a fifth step, the joist attachment bracket 104 is then positioned such that it spans the previously located joists 24 on each side of the junction box 36. In a sixth step, the installer then scribes a line 126 around the joist attachment bracket 104. (See FIGS. 7J and 7*k*.)

Figure 7K:
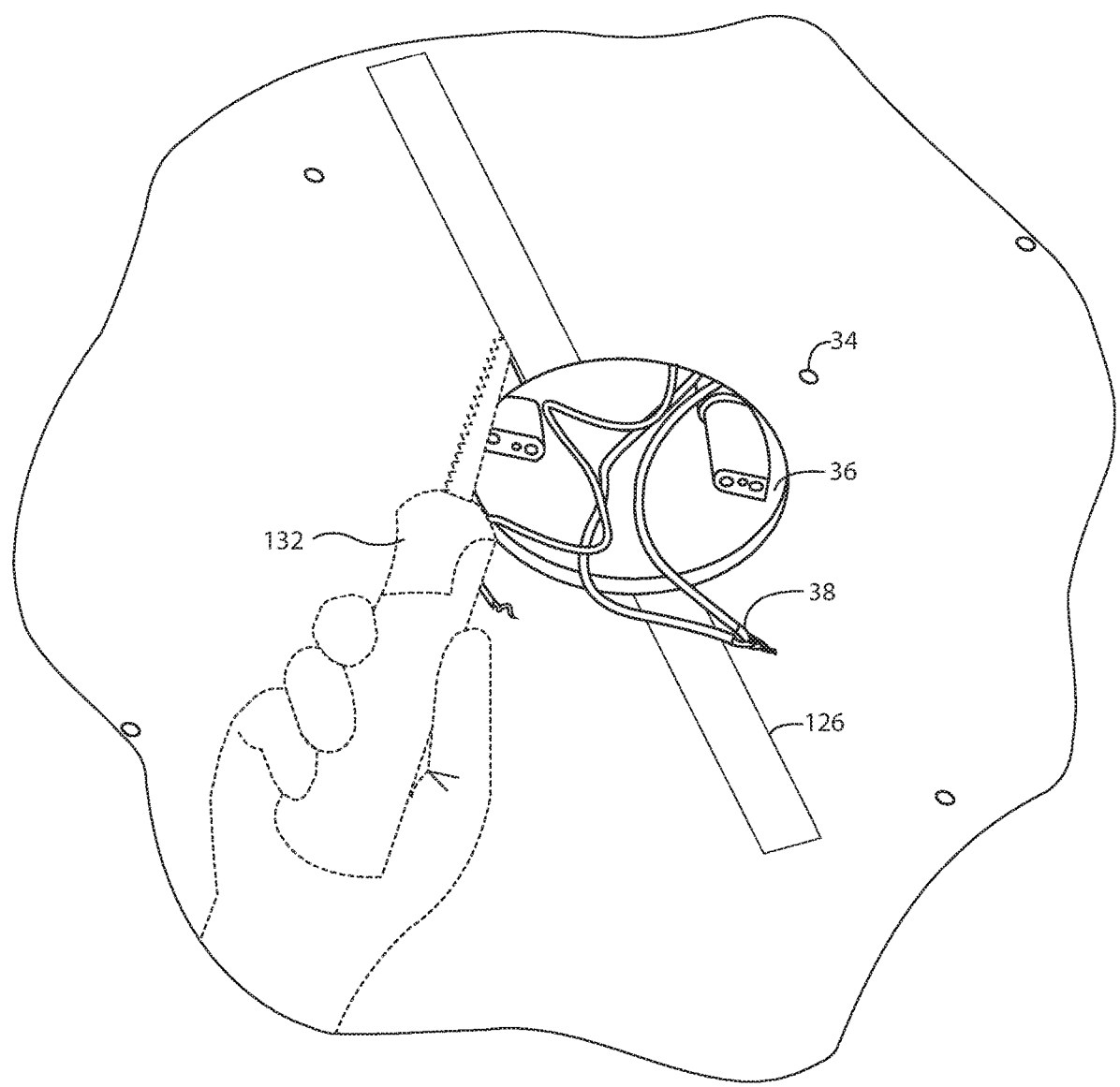
FIG. 7K is a perspective view of an installer cutting out drywall in a ceiling along the line marked in FIG. 7J.
Figure 7L:
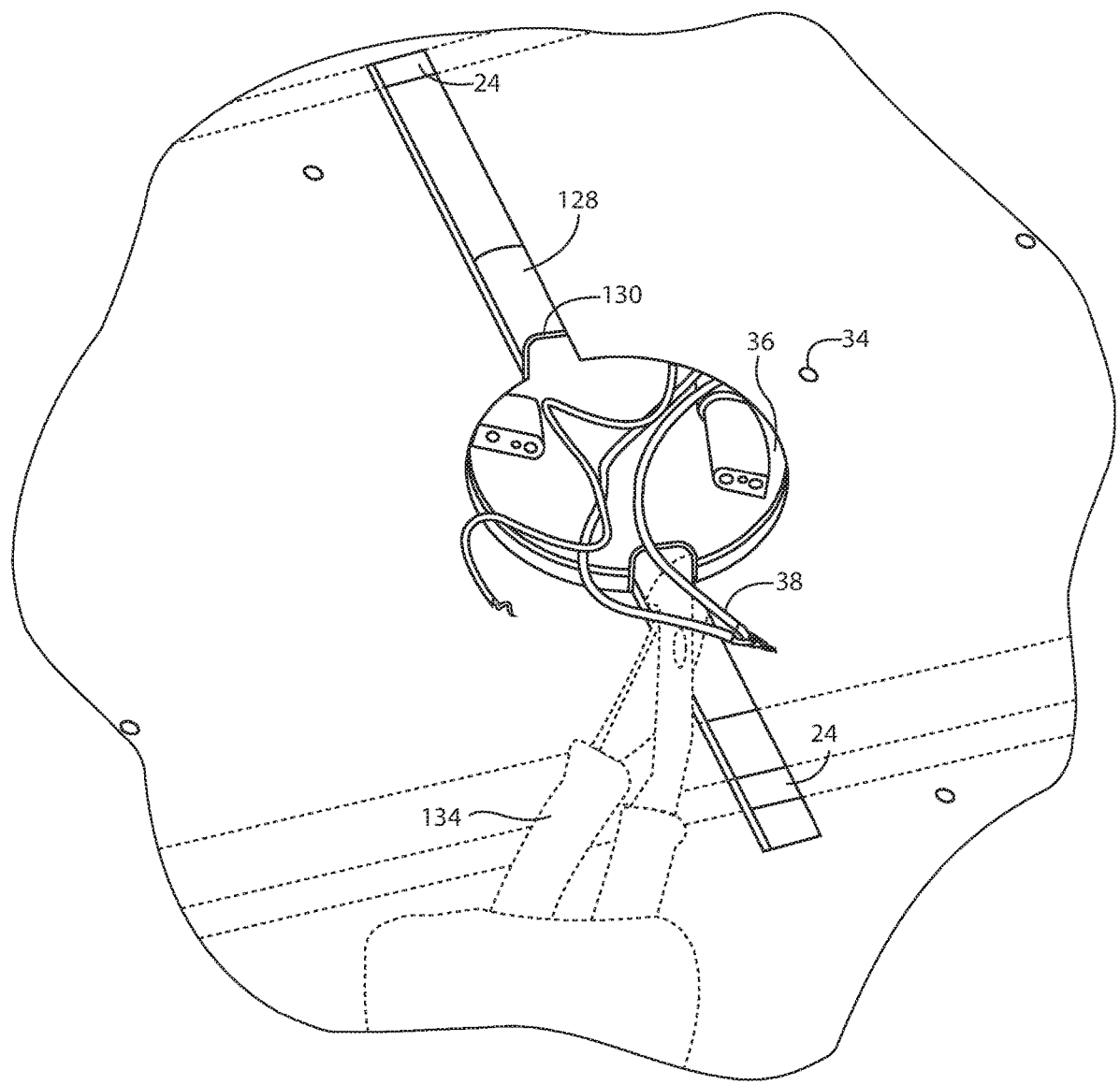
FIG. 7L a perspective view of an installer making a notch in an electrical junction box shown in FIG. 7G to provide clearance for the joist attachment bracket of the present invention.

With reference to FIGS. 7K and 7L, in a seventh step, the cross-bracket 110 and attached joist attachment bracket 104 are removed from the junction box 36 and the installer following the scribe line 126, forms a cutout 128 (see FIG. 7L) in the ceiling drywall 34 with a first cutting tool 132. The cutout 128 serves to expose the ceiling joists 24. In an eighth step, notches 130 are then cut in the electrical junction box 36 with a second cutting tool 134. The notches 130 allow the joist attachment bracket 104 to lay flat across the junction box 36 and the joists 24, when installed.

Figure 7M:
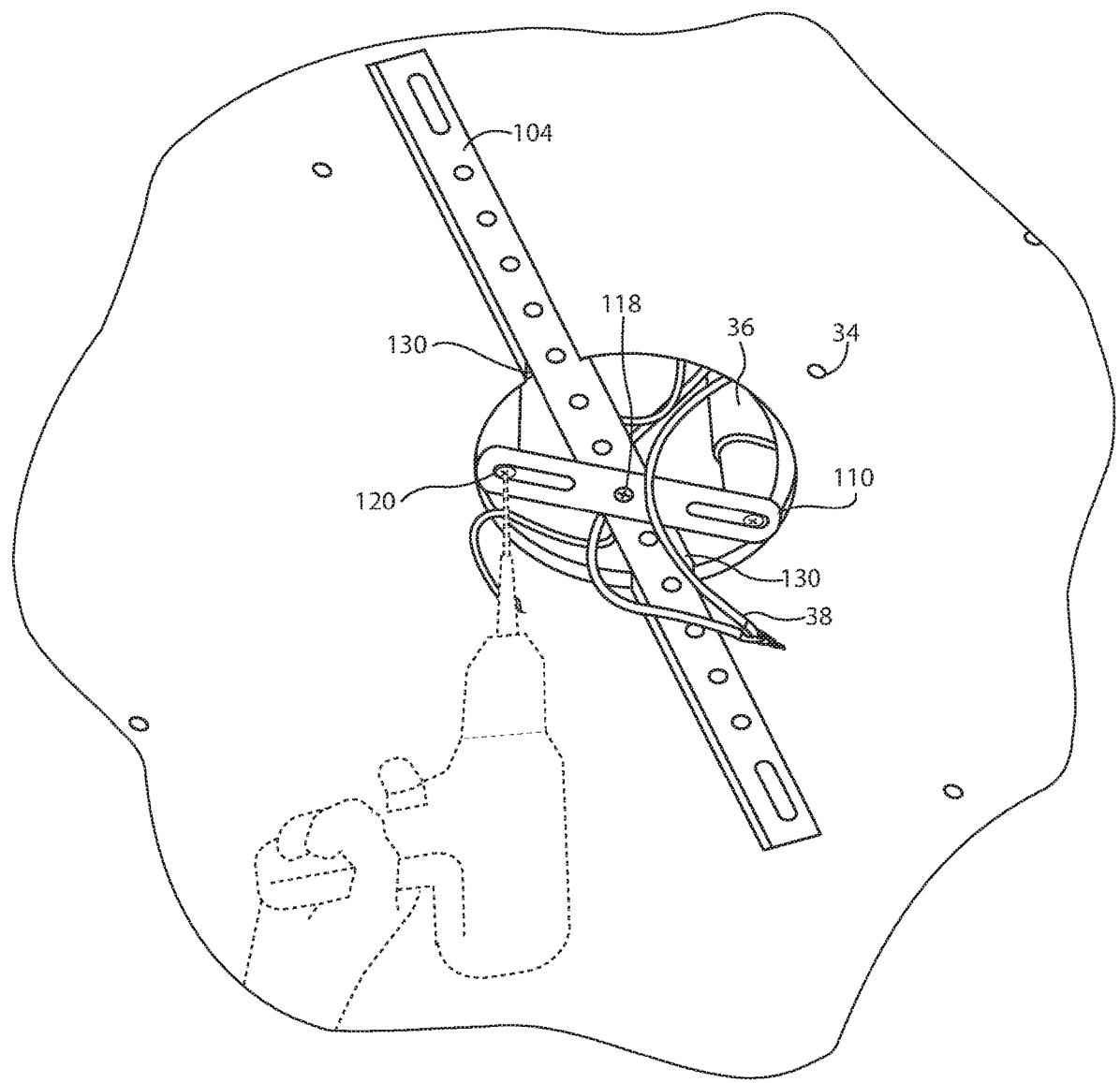
FIG. 7M a perspective view of an installer re-attaching the cross-bracket and joist attachment bracket of the present invention to the electrical junction box of FIG. 7G.
Figure 7N:
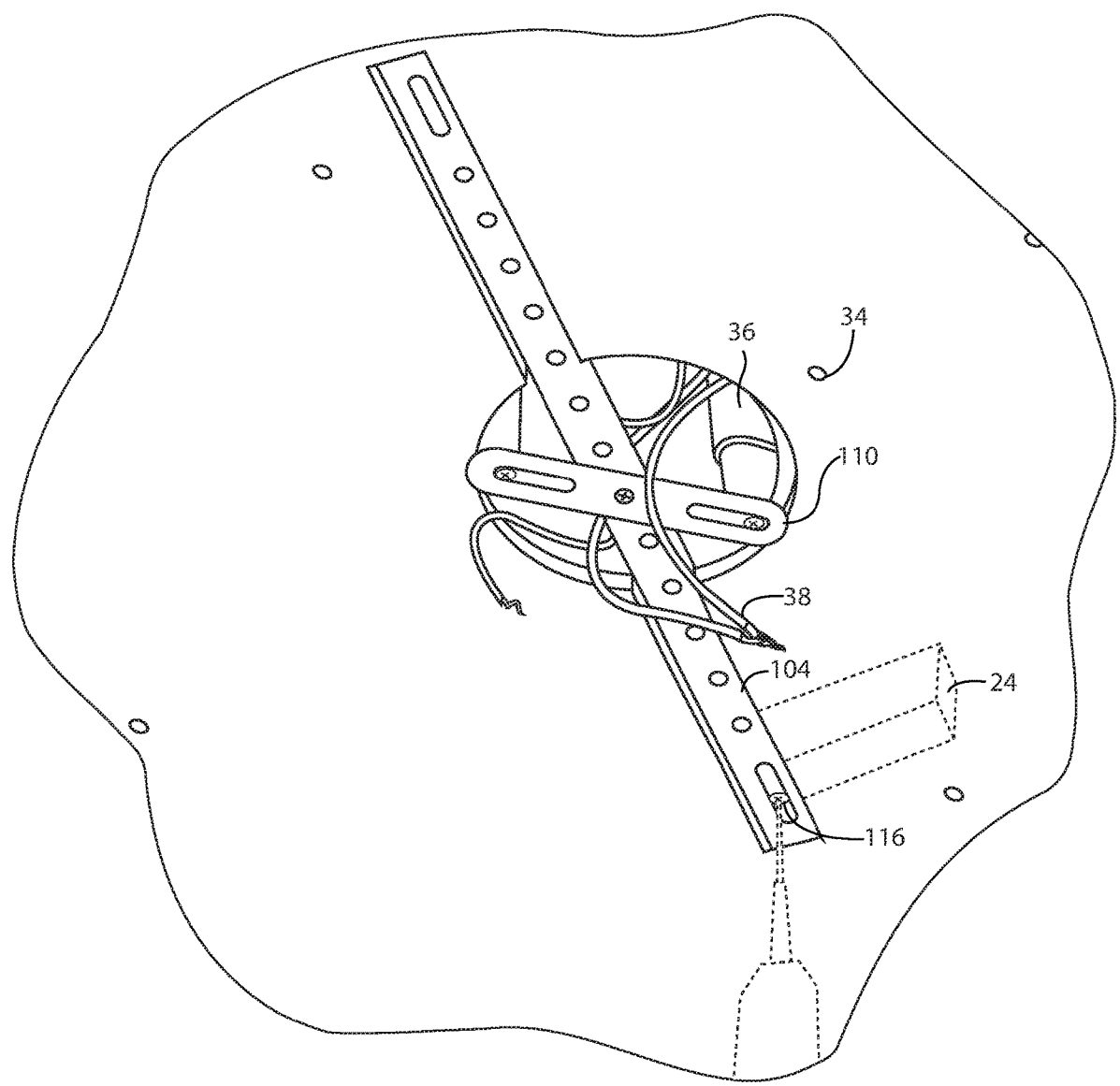
FIG. 7N a perspective view of an installer attaching the joist attachment bracket of the present invention to the joists located in FIG. 7H.
Figure 70:
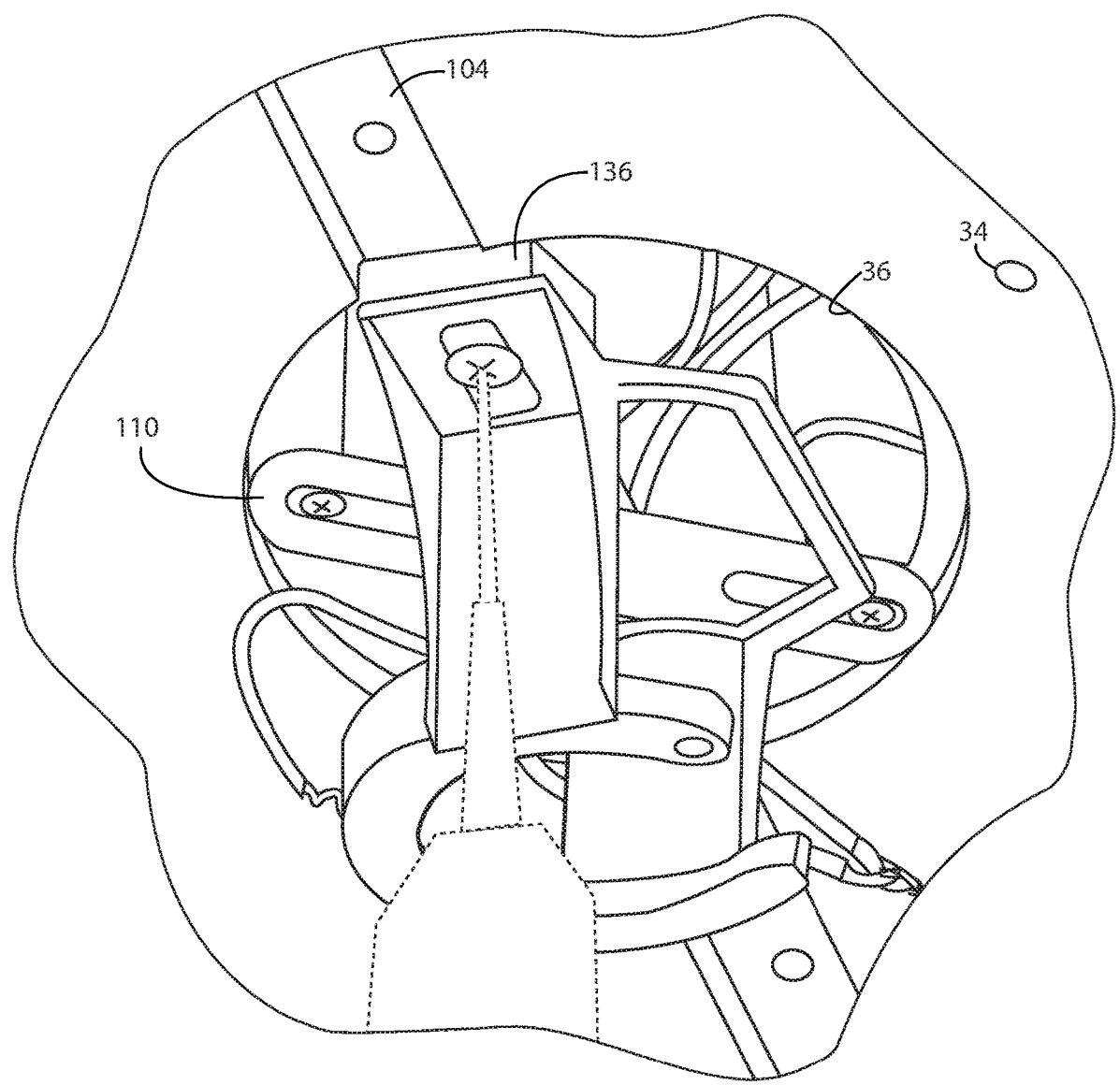

With reference to FIG. 7M, in a ninth step, the cross-bracket 110 with the joist attachment bracket 104 attached, is reattached the electrical junction box 36 via fasteners 120. During this step, the joist attachment bracket 104 is positioned so that it lays within the cutout 128 and is flat across the junction box 36 and the exposed joists 24. With reference to FIG. N, in a tenth step, the installer secures the joist attachment bracket 104 to the joists 24 via fasteners 116.

Figure 7P:
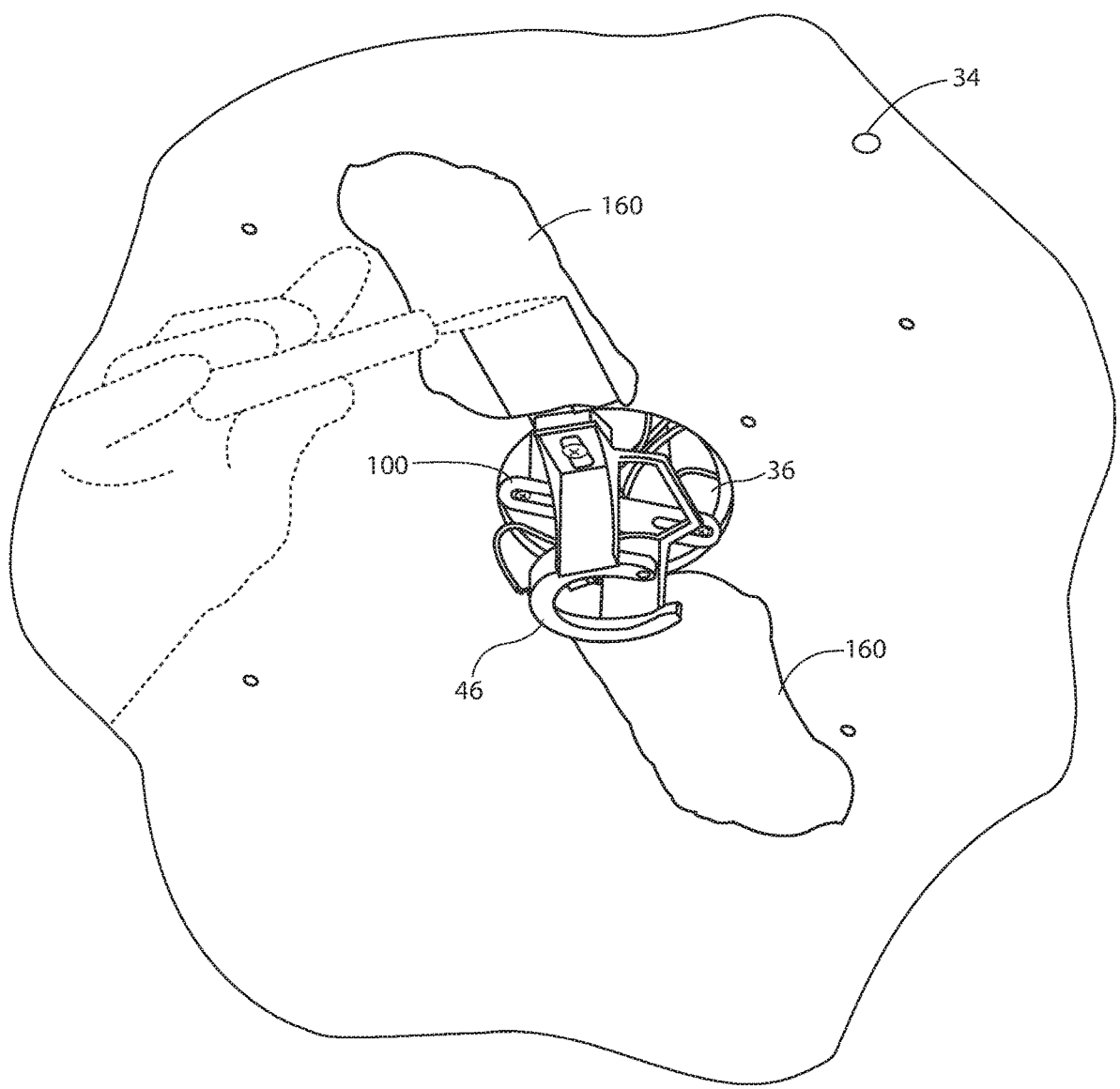
FIG. 7P a perspective view of an installer patching the cutout in the ceiling drywall made in FIG. 7K.

With reference to FIG. 7O, in an eleventh step, a new ceiling fixture or fixture bracket 46 is attached to the joist attachment bracket 104 by means of spacers 136 (where needed) and fasteners 116. With reference to FIG. 7P, in a twelfth step, in a typical, installation, the cutout 128 in the ceiling drywall 34 will be patched with drywall patching 160 for aesthetic reasons, using commercially available drywall patching materials known to those of skill in the art.

Bracketry and methods of installation of the bracketry that eliminate the need to install a heavy duty junction box or fabricate bracing structure at the jobsite when performing a ceiling fan or lighting fixture retrofit has been presented. The bracketry and installation methods disclosed herein substantially reduce the complexity and cost of performing a retrofit installation of a heavy ceiling fan or lighting fixture.

While the present invention has been described with regards to particular embodiments, it is recognized that additional variations of the present invention may be devised without departing from the inventive concept.

What is claimed is:

1. A method for installing a ceiling fixture in a ceiling having a junction box disposed adjacent to a joist, comprising the steps of:
   removing an existing ceiling fixture;
   supplying an L-shaped bracket, wherein the L-shaped bracket comprises a first arm and a second arm, the first arm being attachable to the joist, the second arm being attachable to a ceiling fixture;
   positioning the L-shaped bracket inside the junction box such that the first arm is disposed adjacent a wall of the junction box adjacent to a joist, wherein an end of the second arm extends outside the junction box onto the ceiling;
   scribing a line on the ceiling around the end of the second arm located on the ceiling;
   cutting out the ceiling interior of the scribed line;
   attaching the first arm to the joist from inside the junction box; and
   attaching a ceiling fixture to the second arm.

2. The method for installing a ceiling fixture in a ceiling having a junction box disposed adjacent to a joist of claim 1, further comprising the step of moving wiring disposed within the junction box to create space for the L-shaped bracket.

3. The method for installing a ceiling fixture in a ceiling having a junction box disposed adjacent to a joist of claim 1, wherein the means for attaching to the joist comprises holes in the first arm and screws, whereby the screws are driven through a side wall of the junction box and into the joist.

4. The method for installing a ceiling fixture in a ceiling having a junction box disposed adjacent to a joist of claim 3, wherein the holes in the first arm are countersunk and wherein the countersink is on a side of the first arm which abuts the side wall of the junction box.

5. The method for installing a ceiling fixture in a ceiling having a junction box disposed adjacent to a joist of claim 1, wherein the fixture is attachable to the second arm by means of threaded holes and screws.

* * * * *